(12) United States Patent
Kanskar et al.

(10) Patent No.: US 11,982,835 B2
(45) Date of Patent: May 14, 2024

(54) APPARATUSES FOR SCATTERING LIGHT AND METHODS OF FORMING APPARATUSES FOR SCATTERING LIGHT

(71) Applicant: NLIGHT, INC., Vancouver, WA (US)

(72) Inventors: Manoj Kanskar, Portland, OR (US); Shuang Li, Vancouver, WA (US); Eric Martin, Vancouver, WA (US); Jay Small, Vancouver, WA (US); Jiamin Zhang, Vancouver, WA (US)

(73) Assignee: nLIGHT, Inc., Camas, WA (US)

( * ) Notice: Subject to any disclaimer, the term of this patent is extended or adjusted under 35 U.S.C. 154(b) by 0 days.

(21) Appl. No.: 16/881,560

(22) Filed: May 22, 2020

(65) Prior Publication Data
US 2020/0371285 A1    Nov. 26, 2020

Related U.S. Application Data

(60) Provisional application No. 62/852,511, filed on May 24, 2019.

(51) Int. Cl.
*G02B 6/02*    (2006.01)
*C03B 37/012*    (2006.01)

(52) U.S. Cl.
CPC .... *G02B 6/02395* (2013.01); *C03B 37/01211* (2013.01); *C03B 37/01225* (2013.01)

(58) Field of Classification Search
CPC ............ G02B 6/02395; G02B 6/03694; G02B 6/262; G02B 6/4296; C03B 37/01225; C03B 37/01211
See application file for complete search history.

(56) References Cited

U.S. PATENT DOCUMENTS

| 4,020,546 | A  | * | 5/1977  | May .................... H02G 15/10 29/873 |
| 4,506,946 | A  | * | 3/1985  | Hodge ................ G02B 6/3809 385/64 |
| 5,695,583 | A  | * | 12/1997 | van den Bergh ...... G02B 6/241 156/153 |
| 6,113,589 | A  | * | 9/2000  | Levy .................... A61N 5/0603 606/16 |
| 6,289,150 | B1 | * | 9/2001  | Zarian .................... B26D 3/06 385/31 |
| 6,458,622 | B1 | * | 10/2002 | Keser ...................... H01L 24/11 438/117 |
| 6,907,164 | B2 | * | 6/2005  | Lachance ............. G02B 6/0218 385/37 |

(Continued)

*Primary Examiner* — Andrew Jordan

(57) ABSTRACT

An apparatus for scattering light may include: an optical fiber having a first length; and a sleeve, having a second length shorter than the first length, around the optical fiber. The optical fiber may include: a core; and cladding around the core. The sleeve may include fiber-optic material. The fiber-optic material may be substantially polymer-free. An outer surface of the sleeve may be roughened to scatter the light out of the sleeve through the roughened surface. A method of forming an apparatus for scattering light may include: providing a sleeve having a first length, the sleeve having inner and outer surfaces; providing an optical fiber having a second length longer than the first length; passing the sleeve around the optical fiber or threading the optical fiber through the sleeve; and roughening at least a portion of the outer surface of the sleeve.

16 Claims, 10 Drawing Sheets

(56) References Cited

U.S. PATENT DOCUMENTS

| | | | | |
|---|---|---|---|---|
| 6,955,085 B2* | 10/2005 | Jones | G01V 1/184 | 250/227.14 |
| 7,047,816 B2* | 5/2006 | Jones | G01L 9/0039 | 73/729.1 |
| 7,274,843 B2* | 9/2007 | James, IV | A61B 18/24 | 385/123 |
| 7,706,045 B2* | 4/2010 | Summa | G02B 6/29394 | 359/290 |
| 8,019,190 B2* | 9/2011 | Xia | G02B 6/021 | 385/125 |
| 8,135,247 B2* | 3/2012 | Xia | G01D 5/35316 | 385/12 |
| 8,197,723 B2* | 6/2012 | Roitman | C08F 226/02 | 524/588 |
| 8,213,073 B2* | 7/2012 | Summa | G02B 6/29358 | 359/290 |
| 8,611,716 B2* | 12/2013 | DeMeritt | G02B 6/4214 | 385/132 |
| 8,977,097 B2* | 3/2015 | Filgas | H01S 3/0632 | 385/129 |
| 9,360,643 B2* | 6/2016 | Rinzler | G02B 6/262 | |
| 9,494,739 B2* | 11/2016 | Price | G02B 6/262 | |
| 9,502,786 B2* | 11/2016 | Wang | H01R 4/20 | |
| 9,512,030 B2* | 12/2016 | Mauro | C03C 3/089 | |
| 9,801,435 B2* | 10/2017 | Dymshits | C30B 29/34 | |
| 9,921,151 B2* | 3/2018 | Simcock | G01J 3/32 | |
| 9,931,165 B2* | 4/2018 | Mayer | A61B 18/20 | |
| 10,042,123 B2* | 8/2018 | Rinzler | G02B 6/262 | |
| 10,481,339 B2* | 11/2019 | Lee | G02B 6/14 | |
| 10,845,540 B2* | 11/2020 | Wang | G02B 6/2558 | |
| 2002/0094161 A1* | 7/2002 | Maitland | G02B 6/0008 | 385/31 |
| 2002/0141700 A1* | 10/2002 | Lachance | G02B 6/0218 | 385/99 |
| 2004/0182166 A1* | 9/2004 | Jones | G01L 11/025 | 73/729.1 |
| 2004/0237648 A1* | 12/2004 | Jones | G01P 15/093 | 73/514.26 |
| 2005/0094947 A1* | 5/2005 | James | A61B 18/24 | 385/88 |
| 2006/0188212 A1* | 8/2006 | Oron | G02B 6/4471 | 385/139 |
| 2009/0109540 A1* | 4/2009 | Summa | G02B 6/29358 | 359/615 |
| 2009/0318912 A1* | 12/2009 | Mayer | A61B 18/20 | 606/14 |
| 2010/0165438 A1* | 7/2010 | Summa | G02B 6/29395 | 359/260 |
| 2010/0247026 A1* | 9/2010 | Xia | G02B 6/0218 | 385/12 |
| 2010/0247027 A1* | 9/2010 | Xia | G01D 5/35303 | 385/12 |
| 2010/0314591 A1* | 12/2010 | Roitman | C08F 220/24 | 524/588 |
| 2011/0075965 A1* | 3/2011 | DeMeritt | G02B 6/4214 | 428/164 |
| 2011/0200292 A1* | 8/2011 | Filgas | H01S 3/0632 | 385/141 |
| 2011/0317967 A1* | 12/2011 | Kumkar | G02B 6/2558 | 385/98 |
| 2012/0075636 A1* | 3/2012 | Zilkie | G02F 1/21 | 356/454 |
| 2012/0178859 A1* | 7/2012 | Roitman | C08G 77/14 | 524/109 |
| 2012/0184652 A1* | 7/2012 | Roitman | C08F 220/24 | 524/114 |
| 2013/0011102 A1* | 1/2013 | Rinzler | G02B 6/262 | 385/94 |
| 2013/0272324 A1* | 10/2013 | Williamson, III | H01S 3/08072 | 372/22 |
| 2015/0037552 A1* | 2/2015 | Mauro | B32B 17/00 | 501/65 |
| 2016/0113363 A1* | 4/2016 | Dymshits | C03C 10/0018 | 501/86 |
| 2016/0126643 A1* | 5/2016 | Wang | H01R 4/203 | 439/877 |
| 2016/0266033 A1* | 9/2016 | Simcock | G01J 3/2803 | |
| 2016/0341906 A1* | 11/2016 | Rinzler | G02B 6/262 | |
| 2018/0024294 A1* | 1/2018 | Wang | G02B 6/2558 | 385/78 |
| 2018/0045895 A1* | 2/2018 | Lee | G02B 6/14 | |
| 2020/0346129 A1* | 11/2020 | Ye | A63H 33/108 | |
| 2020/0371285 A1* | 11/2020 | Kanskar | C03B 37/01225 | |
| 2021/0103096 A1* | 4/2021 | Matsumoto | G02B 6/4296 | |
| 2021/0149128 A1* | 5/2021 | Schaevitz | G02B 6/423 | |
| 2021/0215858 A1* | 7/2021 | Liu | G02B 5/0278 | |
| 2023/0280534 A1* | 9/2023 | Wang | G02B 6/2558 | 385/99 |

* cited by examiner

APPARATUSES FOR SCATTERING LIGHT AND METHODS OF FORMING APPARATUSES FOR SCATTERING LIGHT

RELATED APPLICATIONS

This application is a non-provisional of and claims priority benefit to U.S. provisional patent application Ser. No. 62/852,511, filed May 24, 2019, all of which is incorporated by reference herein in its entirety.

TECHNICAL FIELD

The subject matter disclosed herein generally relates to apparatuses for scattering light and methods of forming apparatuses for scattering light. The subject matter disclosed herein also relates to apparatuses for scattering light from optical fibers and methods of forming apparatuses for scattering light from optical fibers.

BACKGROUND

An optical fiber is frequently used to transmit light (e.g.; laser light) from one end of the optical fiber to the other. Such transmission can be over long distances at high data rates, but with low loss of signal. In addition, such transmission generally is not subject to electromagnetic interference.

A typical optical fiber can include a core (with a first index of refraction) and cladding around the core (with a second index of refraction slightly lower than the first index of refraction). Due to the relative indices of refraction, the phenomenon of total internal reflection tends to cause light, transmitted within the core, to stay within the core. Depending on the desired application, cores and/or claddings can be doped. Typically diameters for cores are greater than or equal to 5 microns ("μm") (e.g., ≥5 μm and ≤100 μm for single-mode fibers; often larger for multimode fibers), while typically diameters for claddings are larger than the associated core diameter (e.g., ≥125 μm and ≤600 μm for single-mode fibers; often larger for multimode fibers).

A typical optical fiber also can include a protective film around the cladding. The protective film can include, for example, an inner coating (e.g., silicon resin, silicon rubber) and an outer jacket (e.g., nylon; polyamide).

When light (e.g., laser light) is admitted to one end of an optical fiber, much of the light enters the corresponding end of the core, in which it is transmitted to the other end of the optical fiber for a first portion of the light whose angle of incidence with respect to the core is low enough to be supported by the numerical aperture ("NA") of the core. On the other hand, for a second portion of the light whose angle of incidence with respect to the core is too high to be supported by the NA of the core, that portion of the light tends to escape from the core into the cladding.

In addition, some of the light admitted to one end of the optical fiber enters the corresponding end of the cladding, in which it also propagates toward the other end of the optical fiber. A portion of that light can leak from the cladding into the protective film. Moreover, some of the light intended to be admitted to one end of the optical fiber can be directly incident on the protective film itself.

Light leaking from the cladding into the protective film and light directly incident on the protective film can cause the temperature of the protective film to rise to a level which damages the protective film (e.g., thermal degradation, burning). These problems can limit the maximum power that an optical fiber can safely handle.

One way to increase the maximum power that an optical fiber can safely handle is to remove (or strip) some or all of the light from the cladding, thus reducing the temperature rise of the protective film.

In a first approach, a section of the protective film can be removed from the optical fiber, and then the exposed outer surface of the cladding itself can be roughened. When light in the cladding hits the roughened outer surface of the cladding, a significant portion of that light is scattered out of the cladding, losing some of its directivity in the process.

In a second approach, a section of the protective film can be removed from the optical fiber, and then a rough surface can be formed by a layer of material or particles coated onto the outer surface of the cladding. When light in the cladding hits the layer of material or particles, a significant portion of that light is coupled out of the cladding via the layer of material or particles, and then scattered out of the rough surface, losing some of its directivity in the process.

In a third approach, a section of the protective film can be removed from the optical fiber, and then a high-index polymer layer can be applied to the outer surface of the cladding. When light in the cladding hits the polymer layer, a significant portion of that light is coupled out of the cladding via the polymer layer, losing some of its directivity in the process.

These approaches have various drawbacks, such as complex and costly fabrication, tendency to materially degrade over time, susceptibility to ignition and burning, and limitations in power-handling capability.

Thus, the industry needs apparatuses for scattering light from optical fibers and methods of forming apparatuses for scattering light from optical fibers that avoid or minimize some or all of these various drawbacks.

SUMMARY

At least disclosed herein are apparatuses for scattering light and methods of forming apparatuses for scattering light.

In some examples, an apparatus for scattering light can comprise: an optical fiber having a first length; and/or a sleeve, having a second length shorter than the first length, around the optical fiber. The optical fiber can comprise: a core; and/or cladding around the core. The sleeve can comprise fiber-optic material. The fiber-optic material can be polymer-free, virtually polymer-free, substantially polymer-free, organic-free, virtually organic-free, and/or substantially organic-free. The sleeve can comprise inner and outer surfaces. The outer surface of the sleeve can be roughened to scatter the light out of the sleeve through the roughened surface.

In some examples of the apparatus, the inner surface of the sleeve can directly contact the optical fiber over an entirety of the second length.

In some examples of the apparatus, the inner surface of the sleeve can directly contact the optical fiber over a portion of the second length.

In some examples of the apparatus, the inner surface of the sleeve may not directly contact the optical fiber over a portion of the second length. In such examples, there can be filler between the optical fiber and the sleeve over a portion of the second length or over an entirety of the second length. The filler, for example, can cause the sleeve to adhere to the optical fiber (e.g., adhesive filler).

In some examples, a method of forming an apparatus for scattering light can comprise: providing a sleeve having a first length, the sleeve having inner and outer surfaces; providing an optical fiber having a second length longer than the first length, the optical fiber comprising a core and cladding around the core; passing the sleeve around the optical fiber; and/or roughening at least a portion of the outer surface of the sleeve. The sleeve can comprise fiber-optic material. The fiber-optic material can be polymer-free, virtually polymer-free, substantially polymer-free, organic-free, virtually organic-free, and/or substantially organic-free.

In some examples of the method, the roughening of the at least the portion of the outer surface of the sleeve can occur prior to the passing of the sleeve around the optical fiber.

In some examples of the method, the roughening of the at least the portion of the outer surface of the sleeve can occur during the passing of the sleeve around the optical fiber.

In some examples of the method, the roughening of the at least the portion of the outer surface of the sleeve can occur after the passing of the sleeve around the optical fiber.

In some examples of the method, the method can further comprise: collapsing the sleeve onto the optical fiber.

In some examples of the method, the roughening of the at least the portion of the outer surface of the sleeve can occur prior to the collapsing of the sleeve onto the optical fiber.

In some examples of the method, the roughening of the at least the portion of the outer surface of the sleeve can occur during the collapsing of the sleeve onto the optical fiber.

In some examples of the method, the roughening of the at least the portion of the outer surface of the sleeve can occur after the collapsing of the sleeve onto the optical fiber.

In some examples, a method of forming an apparatus for scattering light can comprise: providing a sleeve having a first length, the sleeve having inner and outer surfaces; providing an optical fiber having a second length longer than the first length, the optical fiber comprising a core and cladding around the core; threading the optical fiber through the sleeve; and/or roughening at least a portion of the outer surface of the sleeve. The sleeve can comprise fiber-optic material. The fiber-optic material can be polymer-free, virtually polymer-free, substantially polymer-free, organic-free, virtually organic-free, and/or substantially organic-free.

In some examples of the method, the roughening of the at least the portion of the outer surface of the sleeve can occur prior to the threading of the optical fiber through the sleeve.

In some examples of the method, the roughening of the at least the portion of the outer surface of the sleeve can occur during the threading of the optical fiber through the sleeve.

In some examples of the method, the roughening of the at least the portion of the outer surface of the sleeve can occur after the threading of the optical fiber through the sleeve.

BRIEF DESCRIPTION OF THE DRAWINGS

The above and/or other aspects and advantages will become more apparent and more readily appreciated from the following detailed description of examples, taken in conjunction with the accompanying drawings, in which.

DETAILED DESCRIPTION

Figure 1A:
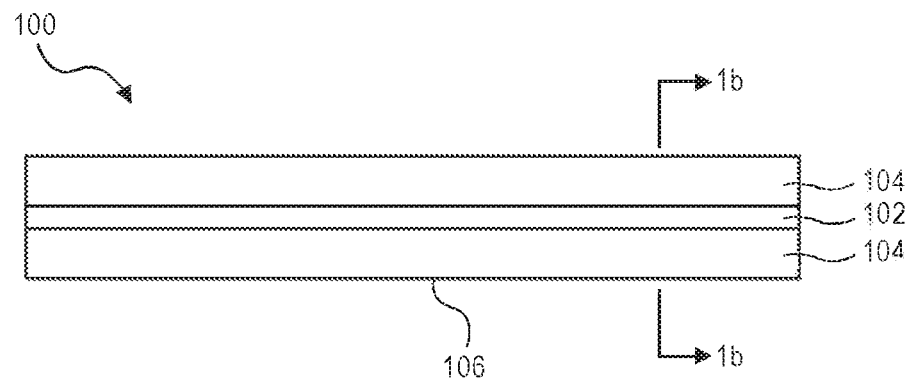
FIG. 1A illustrates a side elevational view of an example uncoated optical fiber.

Exemplary aspects will now be described more fully with reference to the accompanying drawings. Examples of the disclosure, however, can be embodied in many different forms and should not be construed as being limited to the examples set forth herein. Rather, these examples are provided so that this disclosure will be thorough and complete, and will fully convey the scope to a person having ordinary skill in the art ("PHOSITA"). In the drawings, some details may be simplified and/or may be drawn to facilitate understanding rather than to maintain strict structural accuracy, detail, and/or scale. For example, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, or section could be termed a second element, component, region, layer, or section without departing from the teachings of examples.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation(s) depicted in the figures.

The terminology used herein is for the purpose of describing particular examples only and is not intended to be limiting of examples. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatuses can be used in conjunction with other systems, methods, and apparatuses. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by a PHOSITA.

Unless otherwise defined, all terms (including technical and scientific terms) used herein have the same meaning as understood by a PHOSITA. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

The present disclosure is directed to apparatuses for scattering light and methods of forming apparatuses for scattering light.

Definitions

Definitions of words and terms as used herein:
1. As used herein, the term "numerical aperture" or "NA" of an optical system is a dimensionless number that characterizes the range of angles over which the system can accept or emit light.
2. As used herein, the term "fiber-optic material" means fused silica, fused quartz, natural quartz, aluminate glass, aluminophosphate glass, aluminosilicate glass, borate glass, borogermanate glass, borophosphate glass, borosilicate glass, chalcogenide glass, fluoride glass, fluorophosphate glass, germanate glass, germanosilicate glass, halide glass, phosphate glass, phosphosilicate glass, silicate glass, and/or tellurite glass.
3. As used herein, the term "aluminate glass" means glass with aluminum oxide as the main glass-forming constituent (e.g., based on $Al_2O_3$).
4. As used herein, the term "aluminophosphate glass" means glass with aluminum oxide and phosphorus pentoxide as main glass-forming constituents (e.g., based on $Al_2O_3$ and $P_2O_5$).
5. As used herein, the term "aluminosilicate glass" means glass with aluminum oxide and silica as main glass-forming constituents (e.g., based on $Al_2O_3$ and $SiO_2$).
6. As used herein, the term "borate glass" means glass with boron trioxide as the main glass-forming constituent (e.g., based on $B_2O_3$).
7. As used herein, the term "borogermanate glass" means glass with boron trioxide and germanium dioxide as main glass-forming constituents (e.g., based on $B_2O_3$ and $GeO_2$).
8. As used herein, the term "borophosphate glass" means glass with boron trioxide and phosphorus pentoxide as main glass-forming constituents (e.g., based on $B_2O_3$ and $P_2O_5$).
9. As used herein, the term "borosilicate glass" means glass with boron trioxide and silica as main glass-forming constituents (e.g., based on $B_2O_3$ and $SiO_2$),
10. As used herein, the term "chalcogenide glass" means glass containing one or more chalcogens (selenium, sulfur, and/or tellurium, but excluding oxygen and polonium).
11. As used herein, the term "fluoride glass" means glass containing one or more fluorides of various metals (e.g., aluminum, beryllium, calcium, erbium, hafnium, holmium, indium, lead, praseodymium, thulium, ytterbium, zinc, and/or zirconium). Examples include $AlF_3$, $BeF_2$, $HfF_4$, $ZnF_2$, $ZrF_4$, and/or ZBLAN ($ZrF_4$—$BaF_2$—$LaF_3$—$AlF_3$—NaF).
12. As used herein, the term "fluorophosphate glass" means glass containing one or more fluorides of various metals and one or more metaphosphates of various metals (e.g., a mix of fluoride glass and phosphate glass).
13. As used herein, the term "germanate glass" means glass with germanium dioxide as the main glass-forming constituent (e.g., based on $GeO_2$).
14. As used herein, the term "germanosilicate glass" means glass with silica and germanium dioxide as main glass-forming constituents (e.g., based on $GeO_2$ and $SiO_2$, or based on $SiO_2$ doped with germanium).

15. As used herein, the term "halide glass" means glass including anion(s) from elements in Group VIIA of the Periodic Table (e.g., bromine, chlorine, fluorine, and/or iodine) as main glass-forming constituents. Examples include $AlF_3$, $BeF_2$, $BiCl_3$, $CdCl_2$, $HfF_4$, $ThCl_4$, $ZnCl_2$, $ZnF_2$, $ZrF_4$, and/or ZBLAN ($ZrF_4$—$BaF_2$—$LaF_3$—$AlF_3$—NaF).

16. As used herein, the term "phosphate glass" means glass containing one or more metaphosphates (e.g., based on $P_2O_5$) of various metals (e.g., aluminum, erbium, indium, lead, neodymium, praseodymium, thulium, ytterbium, and/or zirconium).

17. As used herein, the term "phosphosilicate glass" means glass with silica and phosphorus pentoxide as main glass-forming constituents (e.g., based on $P_2O_5$ and $SiO_2$).

18. As used herein, the term "silicate glass" means glass with silica as the main glass-forming constituent (e.g., based on $SiO_2$).

19. As used herein, the term "tellurite glass" means glass with tellurium dioxide as the main glass-forming constituent (e.g., based on $TeO_2$).

20. As used herein, the term "organic" means containing the chemical element carbon (C).

21. As used herein, the term "organic-free" means containing less than or equal to 0.1% by weight of the chemical element carbon.

22. As used herein, the term "virtually organic-free" means containing less than or equal to 1% by weight of the chemical element carbon.

23. As used herein, the term "substantially organic-free" means containing less than or equal to 5% by weight of the chemical element carbon.

24. As used herein, the term "monomer" means a molecule or compound, usually comprising carbon, and of relatively low molecular weight and simple structure, 25. As used herein, the term "polymer" means a macromolecule formed by the chemical union of five or more identical monomers.

26. As used herein, the term "polymer-free" means containing less than or equal to 0.1% by weight of a polymer or polymers.

27. As used herein, the term "virtually polymer-free" means containing less than or equal to by weight of a polymer or polymers.

28. As used herein, the term "substantially polymer-free" means containing less than or equal to 5% by weight of a polymer or polymers.

29. As used herein, the term "polymeric material" means material comprising more than 50% by weight of a polymer or polymers.

30. As used herein, the term "roughen" in connection with an outer surface of a sleeve comprising fiber-optic material means areal surface change with generally randomized texture at the surface scale. As known to a PHOSITA, techniques used to roughen an outer surface of such a sleeve can include, for example, additive processes, such as chemical vapor deposition ("CVD"); grinding; laser ablation, cutting, and/or texturing; mechanical abrasion, such as with diamond-impregnated polishing paper or cloth; polishing with, for example, diamond powder; sand blasting; sol-gel chemistry; sputter-etching; thermal or chemical additive processes, such as glass-to-glass bonding; and/or wet and/or dry chemical etching (e.g., using hydrofluoric acid, hydrogen fluoride vapor, ammonium and/or sodium bifluorides).

31. As used herein, the term "modify" in connection with an outer surface of a sleeve comprising fiber-optic material means to change the surface in a periodic manner (e.g., if modified with grooves that are parallel to each other and are perpendicular to an axial direction of sleeve, the grooves have equal depth and spacing along the axial direction of the sleeve) or an aperiodic manner (e.g., if modified with such parallel grooves, the grooves do not have equal depth and/or do not have equal spacing along the axial direction of sleeve). As known to a PHOSITA, modifying in an aperiodic manner can be used to control the amount of light scattered out of the sleeve relative to position along the axial direction of the sleeve. The modifying can be regular or irregular, symmetric or asymmetric.

Optical Fibers

FIG. 1A illustrates a side elevational view of an example uncoated optical fiber 100. Optical fiber 100 includes core 102 and cladding 104 around core 102. Cladding 104 has outer surface 106.

Core 102 has a first index of refraction $n_1$. Cladding 104 has a second index of refraction $n_2$. Generally, $n_1 > n_2$ to achieve total internal reflection in core 102, as is known to a PHOSITA.

Figure 1B:
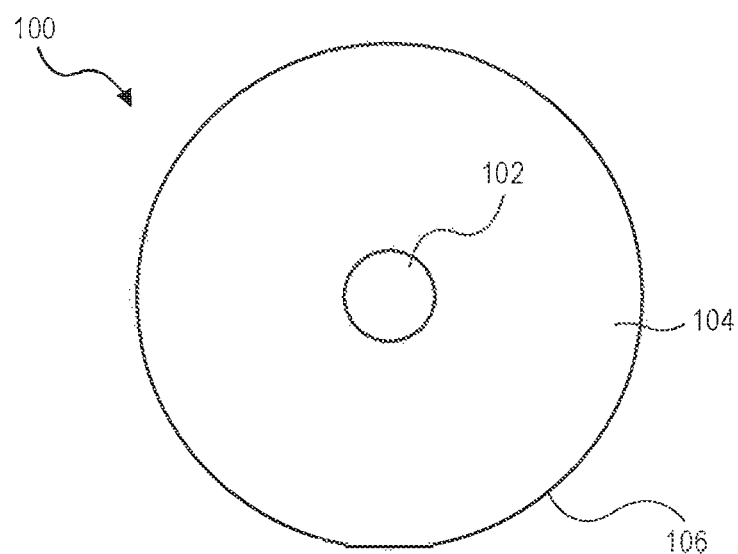
FIG. 1B illustrates a cross-sectional view of the example uncoated optical fiber of FIG. 1A, taken along line 1b-1b of FIG. 1A.

FIG. 1B illustrates a cross-sectional view of the example uncoated optical fiber 100 of FIG. 1A, taken along line 1b-1b of FIG. 1A. Although the cross-section is depicted as being circular, the cross-section can have other shapes, as well. For example, the cross-section of optical fiber 100 can be regular or irregular, symmetric or asymmetric. The cross-section of optical fiber 100 can be, for example, elliptical, hexagonal, pentagonal, rectangular, octagonal, oval, square, trapezoidal, triangular, quadrilateral, or a parallelogram.

Core 102 can comprise, for example, fiber-optic material or polymeric material. As known to a PHOSITA, the material of core 102 can be doped to raise or lower its index of refraction to achieve first index of refraction $n_1$.

Similarly, cladding 104 can comprise, for example, fiber-optic material or polymeric material. As known to a PHOSITA, the material of cladding 104 can be doped to raise or lower its index of refraction to achieve second index of refraction $n_2$.

Core 102 and cladding 104 can comprise the same material. For example, core 102 and cladding 104 can both comprise, for example, the same fiber-optic material or the same polymeric material, but with different types of dopant and/or different levels of dopant.

Figure 2A:
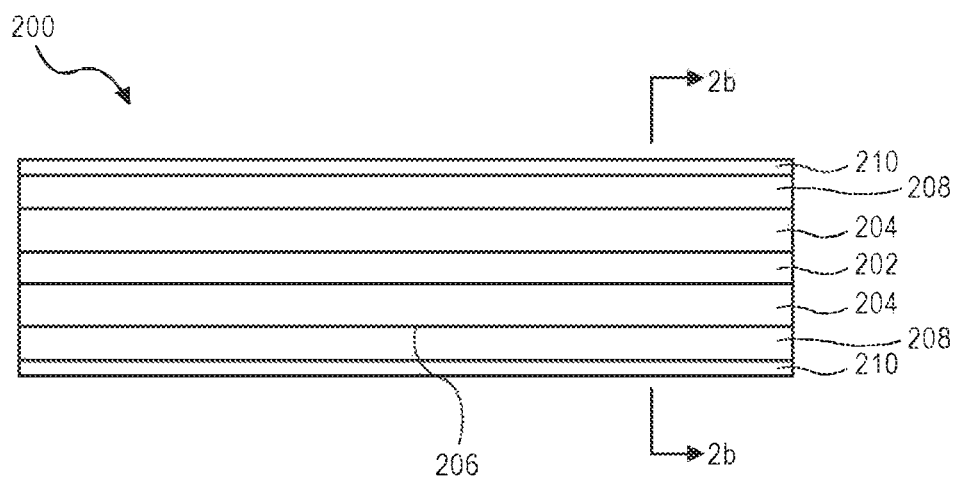
FIG. 2A illustrates a side elevational view of an example coated optical fiber.

FIG. 2A illustrates a side elevational view of an example coated optical fiber 200. Optical fiber 200 includes core 202 and cladding 204 around core 202. Cladding 204 has outer surface 206.

Core 202 has a third index of refraction $n_3$. Cladding 204 has a fourth index of refraction $n_4$. Generally, $n_3 > n_4$ to achieve total internal reflection in core 202, as is known to a PHOSITA.

Optical fiber 200 can include protective film 208 around cladding 204, and jacket 210 around protective film 208. Protective film 208 can comprise, for example, silicon resin or silicon rubber. Jacket 210 can comprise, for example, nylon or polyamide.

Figure 2B:
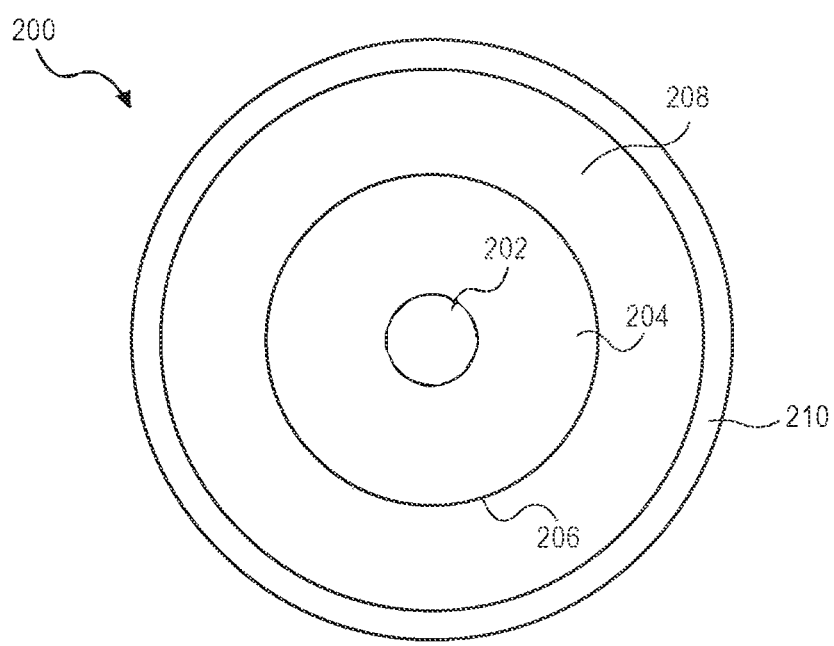
FIG. 2B illustrates a cross-sectional view of the example coated optical fiber of FIG. 2A, taken along line 2b-2b of FIG. 2A.

FIG. 2B illustrates a cross-sectional view of the example coated optical fiber 200 of FIG. 2A, taken along line 2b-2b of FIG. 2A. Although the cross-section is depicted as being circular, the cross-section can have other shapes, as well. For example, the cross-section of optical fiber 200 can be regular or irregular, symmetric or asymmetric. The cross-section of optical fiber 200 can be, for example, elliptical, hexagonal, pentagonal, rectangular, octagonal, oval, square, trapezoidal, triangular, quadrilateral, or a parallelogram.

Core 202 can comprise, for example, fiber-optic material or polymeric material. As known to a PHOSITA, the material of core 202 can be doped to raise or lower its index of refraction to achieve third index of refraction $n_3$.

Similarly, cladding 204 can comprise, for example, fiber-optic material or polymeric material. As known to a PHOSITA, the material of cladding 204 can be doped to raise or lower its index of refraction to achieve fourth index of refraction $n_4$.

Core 202 and cladding 204 can comprise the same material. For example, core 202 and cladding 204 can both comprise, for example, the same fiber-optic material or the same polymeric material, but with different types of dopant and/or different levels of dopant.

Sleeves

Figure 3A:
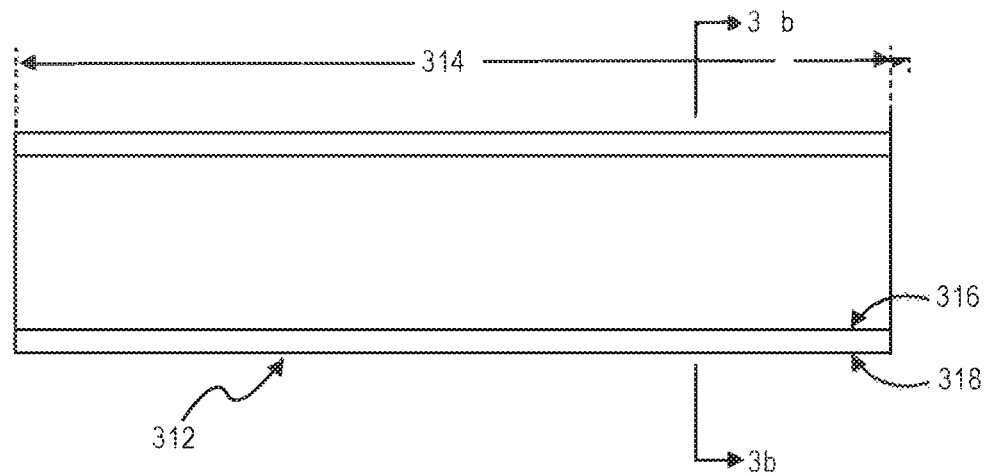
FIG. 3A illustrates a side elevational view of a sleeve for scattering light, according to some example embodiments.

FIG. 3A illustrates a side elevational view of sleeve 312 for scattering light according to some example embodiments, having length 314. Generally, length 314 of sleeve 312 is shorter than the length of an optical fiber with which sleeve 312 is to be associated.

Figure 3B:
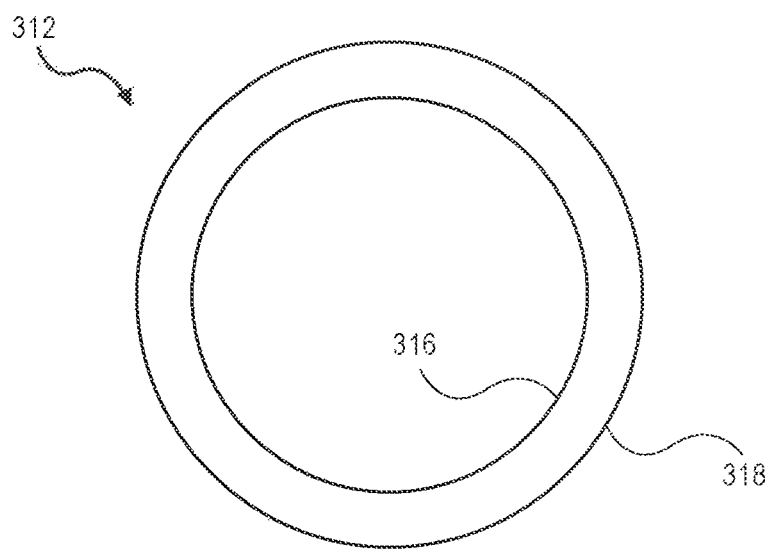
FIG. 3B illustrates a cross-sectional view of the sleeve for scattering light of FIG. 3A, taken along line 3b-3b of FIG. 3A.

FIG. 3B illustrates a cross-sectional view of sleeve 312 for scattering light of FIG. 3A, taken along line 3b-3b of FIG. 3A.

Sleeve 312 has inner surface 316 and outer surface 318. The shapes of inner surface 316 and outer surface 318 can be the same (e.g., cylindrical), although that is not required. Generally, the shape of inner surface 316 can be consistent with the shape of an outer surface of an optical fiber with which sleeve 312 is to be associated.

Outer surface 318 of sleeve 312 can be smooth or roughened.

Sleeve 312 can comprise, for example, fiber-optic material. The fiber-optic material of sleeve 312 can be doped to raise or lower its index of refraction to achieve fifth index of refraction $n_5$.

Generally, for a combination of optical fiber 100 and sleeve 312, $n_1 > n_2$ and $n_5 \geq n_2$. Also, the volumetric coefficients of thermal expansion for the materials of optical fiber 100 and sleeve 312 should be matched (e.g., either the same or nearly the same; if not the same, the sleeve 312 having a slightly higher volumetric coefficient of thermal expansion).

Generally, for a combination of optical fiber 200 and sleeve 312, $n_3 > n_4$ and $n_5 \geq n_4$. Also, the volumetric coefficients of thermal expansion for the materials of optical fiber 200 and sleeve 312 should be matched (e.g., either the same or nearly the same; if not the same, the sleeve 312 having a slightly higher volumetric coefficient of thermal expansion).

Optical Fibers and Sleeves

Figure 4A:
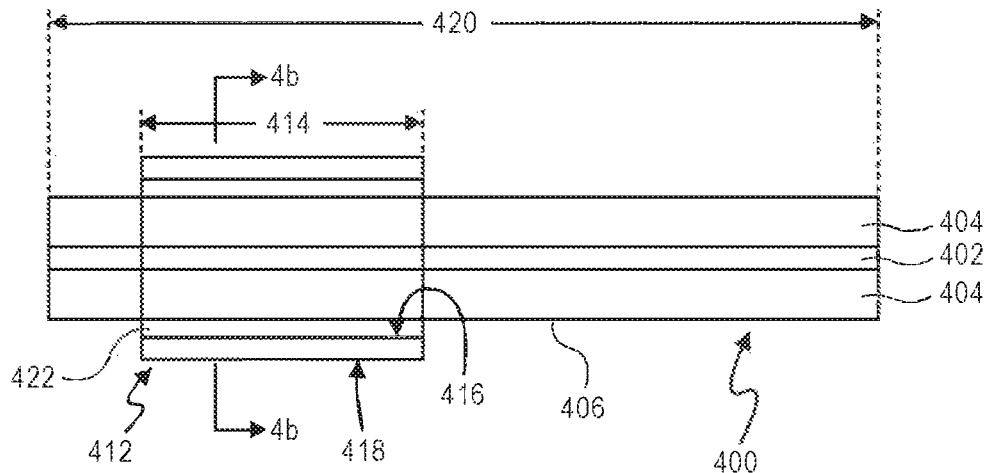
FIG. 4A illustrates a side elevational view of an uncoated optical fiber and a sleeve for scattering light, according to some example embodiments.

FIG. 4A illustrates a side elevational view of an example optical fiber 400, having length 420, and an example sleeve 412 for scattering light according to some example embodiments, having length 414, around optical fiber 400. Generally, length 414 of sleeve 412 is shorter than length 420 of optical fiber 400.

Optical fiber 400 includes core 402 and cladding 404 around core 402. Cladding 404 has outer surface 406. Core 402 has a sixth index of refraction $n_6$. Cladding 404 has a seventh index of refraction $n_7$. Generally, $n_6 > n_7$ to achieve total internal reflection in core 402, as is known to a PHOSITA.

Optical fiber 400 can be, for example, an uncoated optical fiber, similar to optical fiber 100, or a coated optical fiber, similar to optical fiber 200, from which jacket 210 and protective film 208 have been removed (e.g., cut off). In either case, a relevant portion of outer surface 406 of optical fiber 400 can be prepared by removing contaminants (e.g., chemical cleaning with, for example, one or more of acetone, ethanol, isopropyl alcohol, propyl acetate, or specialized solvents).

Figure 4B:
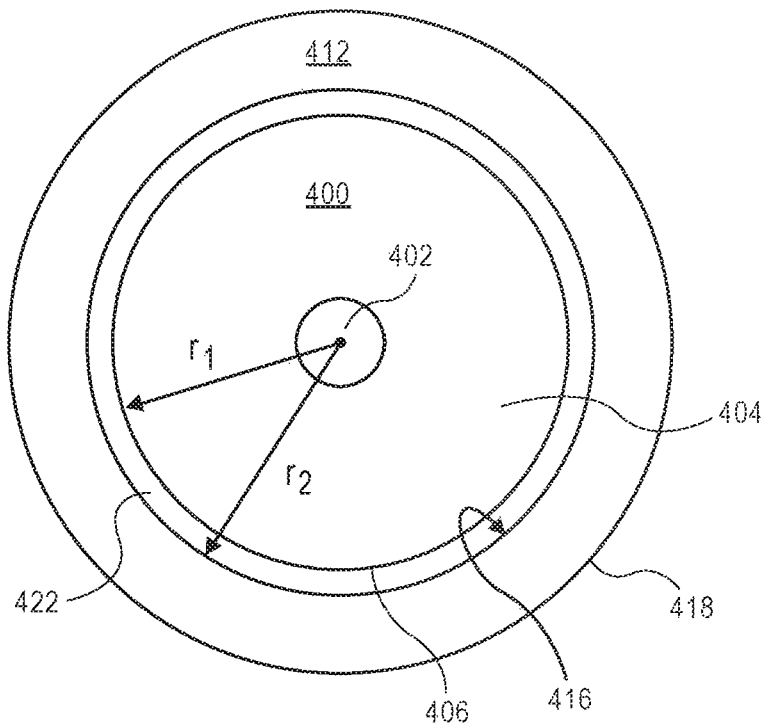
FIG. 4B illustrates a cross-sectional view of the uncoated optical fiber and the sleeve for scattering light of FIG. 4A, taken along line 4b-4b of FIG. 4A.

FIG. 4B illustrates a cross-sectional view of the optical fiber 400 and the sleeve 412 for scattering light of FIG. 4A, taken along line 4b-4b of FIG. 4A.

Sleeve 412 has inner surface 416 and outer surface 418. The shapes of inner surface 416 and outer surface 418 can be the same (e.g., cylindrical), although that is not required. Generally, the shape of inner surface 416 can be consistent with the shape of outer surface 406 of optical fiber 400.

Outer surface 418 of sleeve 412 can be smooth or roughened.

Sleeve 412 can comprise, for example, fiber-optic material. The fiber-optic material of sleeve 412 can be doped to raise or lower its index of refraction to achieve eighth index of refraction $n_8$.

Generally, for a combination of optical fiber 400 and sleeve 412, $n_8 \geq n_7$ to strip out from cladding 404 some or all of the light propagating in cladding 404. Also, the volumetric coefficients of thermal expansion for the materials of optical fiber 400 and sleeve 412 should be matched (e.g., either the same or nearly the same; if not the same, the sleeve 412 having a slightly higher volumetric coefficient of thermal expansion).

Sleeve 412 can be held in place on optical fiber 400, for example, using a substance in gap 422 between outer surface 406 of optical fiber 400 and inner surface 416 of sleeve 412. Such a substance can have a ninth index of refraction $n_9$, where $n_8 \geq n_9 \geq n_7$.

The relative size of optical fiber 400 and sleeve 412 allows optical fiber 400 to be threaded through sleeve 412 or allows sleeve 412 to be passed around optical fiber 400. For example, if the shape of outer surface 406 of optical fiber 400 is cylindrical with radius $r_1$ and the shape of inner surface 416 of sleeve 412 is cylindrical with radius $r_2$, then $r_2 > r_1$, as shown in FIG. 4B. The difference in relative size can be identified by gap 422. Gap 422 between outer surface 406 of optical fiber 400 and inner surface 416 of sleeve 412 is preferably small, but large enough, for example, to allow optical fiber 400 to be threaded through sleeve 412 or to allow sleeve 412 to be passed around optical fiber 400.

If the shape of outer surface 406 of optical fiber 400 is cylindrical with radius $r_1$ and the shape of inner surface 416 of sleeve 412 is cylindrical with radius $r_2$, it can be possible to thread optical fiber 400 through sleeve 412 or to pass sleeve 412 around optical fiber 400 when $r_2 = r_1$ or even when $r_2 < r_1$, however, such an approach would need to address the relevant static and/or dynamic coefficients of friction, as well as various manufacturing concerns associated with what is likely a more difficult challenge than when $r_2 > r_1$.

Gap 422 can be reduced or eliminated by collapsing sleeve 412 onto outer surface 406 of optical fiber 400, for example, using heat. Heat can be supplied, for example, using localized heating, such as one or more electrical arcs, one or more gas flames, one or more laser sources (e.g., $CO_2$ laser), or some combination thereof.

As sleeve 412 is heated, the locally heated material of sleeve 412 starts to melt. Due, for example, to cohesion in the melted material, surface tension of the material of sleeve 412 tends to cause the material to acquire the least surface area possible, collapsing inner surface 416 of sleeve 412 onto outer surface 406 of optical fiber 400.

The process of heating sleeve 412 can proceed, for example, from a first end of sleeve 412 to an opposite end of sleeve 412. In this way, air or other gases present in gap 422 between inner surface 416 of sleeve 412 and outer surface 406 of optical fiber 400 can be expelled from gap 422 as gap 422 gradually closes due to the collapse of sleeve 412 onto outer surface 406 of optical fiber 400.

Other approaches are possible. For example, the process of heating can proceed from a central portion of sleeve 412 toward both ends of sleeve 412, either in one direction at a time or simultaneously in both directions. No matter what approach is used, there should be no bubbles of air or gas trapped between collapsed sleeve 412 and outer surface 406 of optical fiber 400.

In order to significantly reduce or eliminate contaminants (such as microscopic dust particles, powders, oils, film residues), both outer surface 406 of optical fiber 400 and inner surface 416 of sleeve 412 should be substantially free of contamination.

A coated optical fiber, similar to optical fiber 200, should have both jacket 210 and protective film 208 carefully removed, followed by thorough cleaning. An uncoated optical fiber, similar to optical fiber 100, should be thoroughly cleaned. In either case, outer surface 406 of optical fiber 400 should be substantially free of contamination.

In addition, inner surface 416 of sleeve 412 should be thoroughly cleaned. Inner surface 416 of sleeve 412 also should be substantially free of contamination.

Such cleaning can be, for example, dry cleaning or wet cleaning (e.g., chemical cleaning). Although either approach can be used, a combination of both approaches can be more effective than either approach by itself.

Chemical cleaning can use, for example, one or more of acetone, ethanol, isopropyl alcohol, propyl acetate, or specialized solvents.

Outer surface 418 of sleeve 412 can be smooth or roughened.

Outer surface 418 of sleeve 412 can be roughened before, during, and/or after optical fiber 400 is threaded through sleeve 412 or sleeve 412 is passed around optical fiber 400.

Collapsing Sleeves onto Optical Fibers

Figure 5:
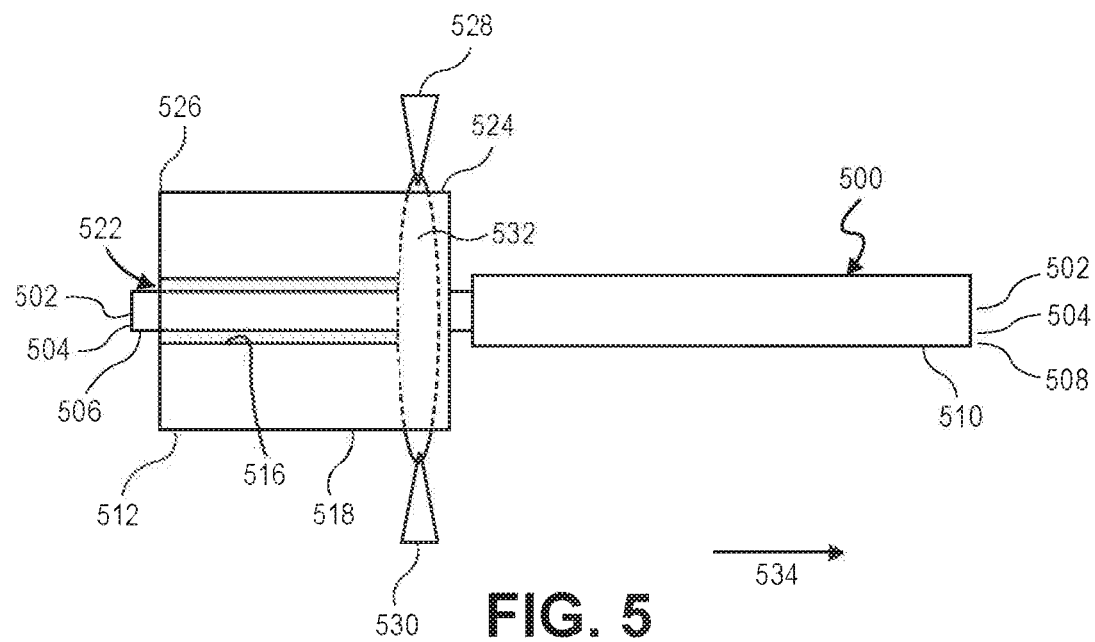
FIG. 5 illustrates a side elevational view of a coated optical fiber and a sleeve for scattering light, according to some example embodiments.

FIG. 5 illustrates a side elevational view of an example coated optical fiber 500 and a sleeve 512 for scattering light according to some example embodiments. On the right-hand side of FIG. 5, optical fiber 500 includes core 502, cladding 504 around core 502, protective film 508 around cladding 504, and jacket 510 around protective film 508. On the left-hand side of FIG. 5, jacket 510 and protective film 508 have been removed, leaving core 502 and cladding 504. Cladding 504 has outer surface 506, which can be prepared by removing contaminants (e.g., cleaning).

The left-hand side FIG. 5 also illustrates sleeve 512 for scattering light according to some example embodiments around both core 502 and cladding 504 of optical fiber 500 (e.g., optical fiber 500 was threaded through sleeve 512 or sleeve 512 was passed around optical fiber 500). Sleeve 512 has inner surface 516, outer surface 518, first end 524, and second end 526. Gap 522 exists between outer surface 506 of cladding 504 and inner surface 516 of sleeve 512.

Optical fiber 500 and sleeve 512 can be positioned near a heating source, such as electrodes 528 and 530. Electrodes 528 and 530 can represent a group of electrodes, for example, which effectively can heat a portion of sleeve 512 around an entire circumference of sleeve 512. Such groups of electrodes can comprise, for example, three electrodes spaced 120° from each other in a triangular pattern (a total of 3 electrodes forming a triangular-shaped arc with heat zone 532 that is relatively narrow in a direction perpendicular to the triangular pattern (e.g., in the direction of arrow 534), the narrowness stemming from a single electrode at each apex of the triangle), or three pairs of electrodes spaced 120° from each other in a triangular pattern (a total of 6 electrodes forming a triangular-shaped arc with heat zone 532 that is relatively wide in a direction perpendicular to the triangular pattern (e.g., in the direction of arrow 534), the width stemming from two electrodes at each apex of the triangle, the two electrodes spaced from each other in the direction perpendicular to the triangular pattern, effectively forming two parallel triangular patterns). One example of such a three-electrode system can be found in the Ring of Fire® technology incorporated in a Large Diameter Splicing System (LDS 2.5) sold by 3SA E Technologies, Inc., of Franklin, Tennessee.

With optical fiber 500 and sleeve 512 positioned as shown in FIG. 5, optical fiber 500 and sleeve 512 can move relative to electrodes 528 and 530 in the direction of arrow 534. Electrodes 528 and 530 can be energized to provide local heating sufficient to melt the material of sleeve 512, causing inner surface 516 of sleeve 512 to collapse onto outer surface 506 of cladding 504.

FIG. 5 illustrates the melting and collapse of sleeve 512 near first end 524 of sleeve 512. As optical fiber 500 and sleeve 512 move relative to electrodes 528 and 530 in the direction of arrow 534, the collapse of inner surface 516 of sleeve 512 onto outer surface 506 of cladding 504 progresses toward second end 526 of sleeve 512. As the collapse progresses from first end 524 of sleeve 512 toward second end 526 of sleeve 512, gap 522 gradually closes and air and/or other gases present in gap 522 are expelled from gap 522.

Assuming that optical fiber 500 and sleeve 512 are substantially free of contamination and the collapse of inner surface 516 of sleeve 512 onto outer surface 506 of cladding 504 is conducted in a controlled, clean environment, the bond between inner surface 516 of sleeve 512 and outer surface 506 of cladding 504 should be substantially free of contamination, as well.

Forming Apparatuses for Scattering Light

Figure 6:
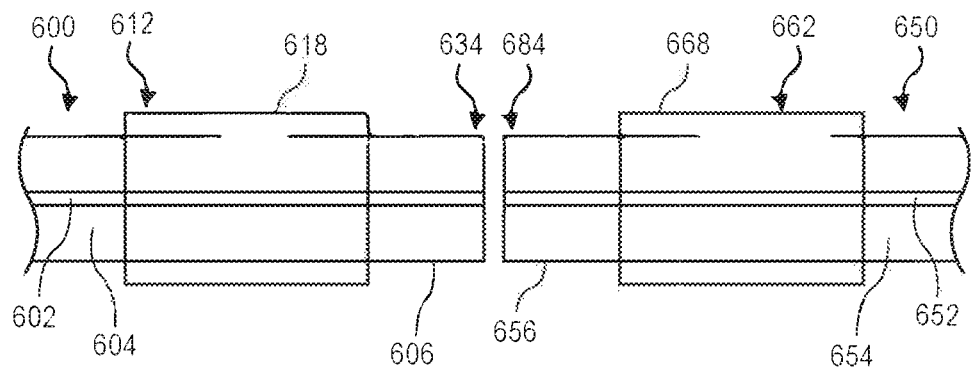
FIG. 6 illustrates a side elevational view of a first optical fiber, a first sleeve for scattering light, a second optical fiber, and a second sleeve for scattering light, according to some example embodiments.

FIG. 6 illustrates a side elevational view of first optical fiber 600, first sleeve 612 for scattering light, second optical fiber 650, and second sleeve 662 for scattering light, according to some example embodiments. Either or both of optical fiber 600 or optical fiber 650 can be uncoated optical fibers or coated optical fibers from which additional layers (e.g., protective film, jacket) have been removed.

As illustrated in FIG. 6, optical fiber 600 includes core 602, cladding 604, and end 634. Cladding 604 has outer surface 606 and first sleeve 612 has outer surface 618. First sleeve 612 has been collapsed onto outer surface 606 of cladding 604.

As also illustrated in FIG. 6, optical fiber 650 includes core 652, cladding 654, and end 684. Cladding 654 has outer surface 656 and second sleeve 662 has outer surface 668. Second sleeve 662 has been collapsed onto outer surface 656 of cladding 654.

In FIG. 6, end 634 of optical fiber 600 and end 684 of optical fiber 650 have been aligned for splicing.

Outer surface 618 of first sleeve 612 can be roughened before, during, and/or after collapse of first sleeve 612 onto outer surface 606 of cladding 604. Outer surface 618 of first sleeve 612 can be roughened before, during, and/or after splicing of end 634 of optical fiber 600 and end 684 of optical fiber 650.

Outer surface 668 of second sleeve 662 can be roughened before, during, and/or after collapse of second sleeve 662 onto outer surface 656 of cladding 654. Outer surface 668 of second sleeve 662 can be roughened before, during, and/or after splicing of end 634 of optical fiber 600 and end 684 of optical fiber 650.

A method of forming an apparatus for scattering light can comprise: providing a first optical fiber with a first sleeve collapsed onto the first optical fiber; providing a second optical fiber with a second sleeve collapsed onto the second optical fiber; aligning an end of the first optical fiber with an end of the second optical fiber; and/or joining together the ends of first and second optical fibers. For example, a method of forming an apparatus for scattering light can comprise: providing first optical fiber 600 with first sleeve 612 collapsed onto first optical fiber 600; providing second optical fiber 650 with second sleeve 662 collapsed onto second optical fiber 650; aligning end 634 of first optical fiber 600 with end 684 of second optical fiber 650; and/or joining together end 634 and end 684 using one or more techniques known to a PHOSITA.

A method of forming an apparatus for scattering light can comprise: roughening an outer surface of the first sleeve before, during, and/or after the collapse of the first sleeve onto the first optical fiber; and/or roughening an outer surface of the first sleeve before, during, and/or after the joining together of the ends of the first and second optical fibers. For example, a method of forming an apparatus for scattering light can comprise: roughening outer surface 618 of first sleeve 612 before, during, and/or after the collapse of first sleeve 612 onto first optical fiber 600; and/or roughening outer surface 618 of first sleeve 612 before, during, and/or after the joining together of end 634 and end 684 using one or more techniques known to a PHOSITA. For example, a method of forming an apparatus for scattering light can comprise: roughening outer surface 668 of second sleeve 662 before, during, and/or after the collapse of second sleeve 662 onto second optical fiber 650; and/or roughening outer surface 668 of second sleeve 662 before, during, and/or after the joining together of end 634 and end 684 using one or more techniques known to a PHOSITA.

A method of forming an apparatus for scattering light can comprise: roughening an outer surface of the first sleeve before, during, and/or after the collapse of the first sleeve onto the first optical fiber; and/or roughening an outer surface of the second sleeve before, during, and/or after the collapse of the second sleeve onto the second optical fiber. For example, a method of forming an apparatus for scattering light can comprise: roughening outer surface 618 of first sleeve 612 before, during, and/or after the collapse of first sleeve 612 onto first optical fiber 600; and/or roughening outer surface 668 of second sleeve 662 before, during, and/or after the collapse of second sleeve 662 onto second optical fiber 650.

A method of forming an apparatus for scattering light can comprise: roughening an outer surface of the first sleeve before, during, and/or after the joining together of the ends of the first and second optical fibers; and/or roughening an outer surface of the second sleeve before, during, and/or after the joining together of the ends of the first and second optical fibers. For example, a method of forming an apparatus for scattering light can comprise: roughening outer surface 618 of first sleeve 612 before, during, and/or after the joining together of end 634 and end 684 using one or more techniques known to a PHOSITA; and/or roughening outer surface 668 of second sleeve 662 before, during, and/or after the joining together of end 634 and end 684 using one or more techniques known to a PHOSITA.

Figure 7:
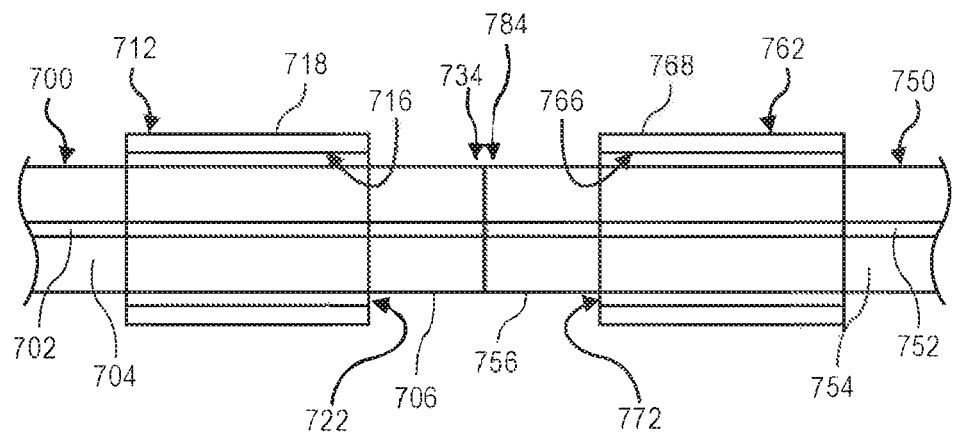
FIG. 7 illustrates a side elevational view of a first optical fiber, a first sleeve for scattering light, a second optical fiber, and a second sleeve for scattering light, according to some example embodiments.

FIG. 7 illustrates a side elevational view of first optical fiber 700, first sleeve 712 for scattering light, second optical fiber 750, and second sleeve 762 for scattering light, according to some example embodiments. Either or both of optical fiber 700 or optical fiber 750 can be uncoated optical fibers or coated optical fibers from which additional layers (e.g., protective film, jacket) have been removed.

As illustrated in FIG. 7, optical fiber 700 includes core 702, cladding 704, and end 734. Cladding 704 has outer surface 706, and first sleeve 712 has inner surface 716 and outer surface 718. First sleeve 712 has not yet been collapsed onto outer surface 706 of cladding 704, so that gap 722 exists between outer surface 706 of cladding 704 and inner surface 716 of first sleeve 712.

As also illustrated in FIG. 7, optical fiber 750 includes core 752, cladding 754, and end 784. Cladding 754 has outer surface 756, and second sleeve 762 has inner surface 766 and outer surface 768. Second sleeve 762 has not yet been collapsed onto outer surface 756 of cladding 754, so that gap 772 exists between outer surface 756 of cladding 754 and inner surface 766 of second sleeve 762.

In FIG. 7, end 734 of optical fiber 700 and end 784 of optical fiber 750 already have been spliced.

Outer surface 718 of first sleeve 712 can be roughened before, during, and/or after collapse of first sleeve 712 onto outer surface 706 of cladding 704. Outer surface 718 of first sleeve 712 can be roughened before, during, and/or after splicing of end 734 of optical fiber 700 and end 784 of optical fiber 750.

Outer surface 768 of second sleeve 762 can be roughened before, during, and/or after collapse of second sleeve 762 onto outer surface 756 of cladding 754. Outer surface 768 of second sleeve 762 can be roughened before, during, and/or after splicing of end 734 of optical fiber 700 and end 784 of optical fiber 750.

A method of forming an apparatus for scattering light can comprise: providing a first optical fiber with a first sleeve not yet collapsed onto the first optical fiber; providing a second optical fiber with a second sleeve not yet collapsed onto the second optical fiber; aligning an end of the first optical fiber with an end of the second optical fiber; and/or joining together the ends of first and second optical fibers. For example, a method of forming an apparatus for scattering light can comprise: providing first optical fiber 700 with first sleeve 712 not yet collapsed onto first optical fiber 700; providing second optical fiber 750 with second sleeve 762 not yet collapsed onto second optical fiber 750; aligning end 734 of first optical fiber 700 with end 784 of second optical fiber 750; and/or joining together end 734 and end 784 using one or more techniques known to a PHOSITA.

A method of forming an apparatus for scattering light can comprise: roughening an outer surface of the first sleeve before, during, and/or after the collapse of the first sleeve onto the first optical fiber; and/or roughening an outer surface of the first sleeve before, during, and/or after the joining together of the ends of the first and second optical fibers. For example, a method of forming an apparatus for scattering light can comprise: roughening outer surface 718 of first sleeve 712 before, during, and/or after the collapse of first sleeve 712 onto first optical fiber 700; and/or roughening outer surface 718 of first sleeve 712 before, during, and/or after the joining together of end 734 and end 784 using one or more techniques known to a PHOSITA. For example, a method of forming an apparatus for scattering light can comprise: roughening outer surface 768 of second sleeve 762 before, during, and/or after the collapse of second sleeve 762 onto second optical fiber 750; and/or roughening outer surface 768 of second sleeve 762 before, during, and/or after the joining together of end 734 and end 784 using one or more techniques known to a PHOSITA.

A method of forming an apparatus for scattering light can comprise: roughening an outer surface of the first sleeve before, during, and/or after the collapse of the first sleeve onto the first optical fiber; and/or roughening an outer surface of the second sleeve before, during, and/or after the collapse of the second sleeve onto the second optical fiber. For example, a method of forming an apparatus for scattering light can comprise: roughening outer surface 718 of first sleeve 712 before, during, and/or after the collapse of first sleeve 712 onto first optical fiber 700; and/or roughening outer surface 768 of second sleeve 762 before, during, and/or after the collapse of second sleeve 762 onto second optical fiber 750.

A method of forming an apparatus for scattering light can comprise: roughening an outer surface of the first sleeve before, during, and/or after the joining together of the ends of the first and second optical fibers; and/or roughening an outer surface of the second sleeve before, during, and/or after the joining together of the ends of the first and second optical fibers. For example, a method of forming an apparatus for scattering light can comprise: roughening outer surface 718 of first sleeve 712 before, during, and/or after the joining together of end 734 and end 784 using one or more techniques known to a PHOSITA; and/or roughening outer surface 768 of second sleeve 762 before, during, and/or after the joining together of end 734 and end 784 using one or more techniques known to a PHOSITA.

Figure 8A:
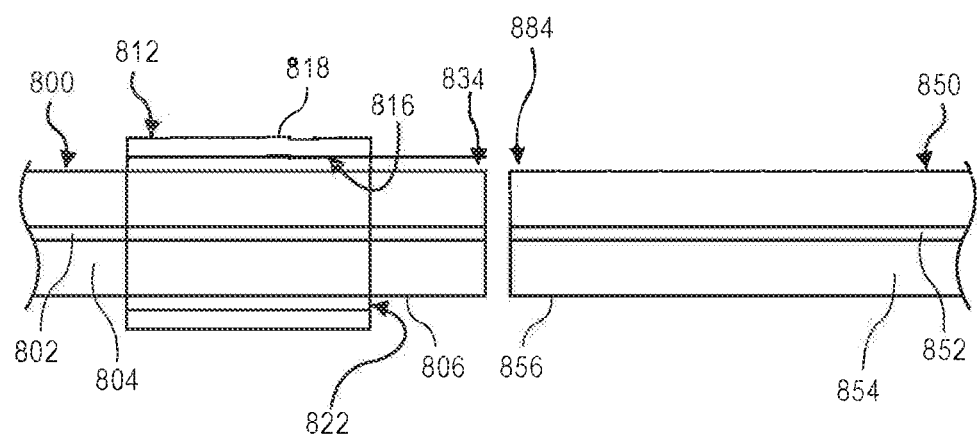
FIG. 8A illustrates a side elevational view of a first optical fiber, a first sleeve for scattering light, and a second optical fiber, according to some example embodiments.

FIG. 8A illustrates a side elevational view of first optical fiber 800, first sleeve 812 for scattering light, and second optical fiber 850, according to some example embodiments. Either or both of first optical fiber 800 or second optical fiber 850 can be uncoated optical fibers or coated optical fibers from which additional layers (e.g., protective film, jacket) have been removed.

As illustrated in FIG. 8A, first optical fiber 800 includes core 802, cladding 804, and end 834. Cladding 804 has outer surface 806, and first sleeve 812 has inner surface 816 and outer surface 818. First sleeve 812 has not yet been collapsed. Gap 822 exists between outer surface 806 of cladding 804 and inner surface 816 of sleeve 812.

As also illustrated in FIG. 8A, second optical fiber 850 includes core 852, cladding 854, and end 884. Cladding 854 has outer surface 856.

Additionally, as illustrated in FIG. 8A, end 834 of first optical fiber 800 and end 884 of second optical fiber 850 are aligned for splicing.

Outer surface 818 of first sleeve 812 can be roughened before, during, and/or after splicing of end 834 of first optical fiber 800 and end 884 of second optical fiber 850.

Figure 8B:
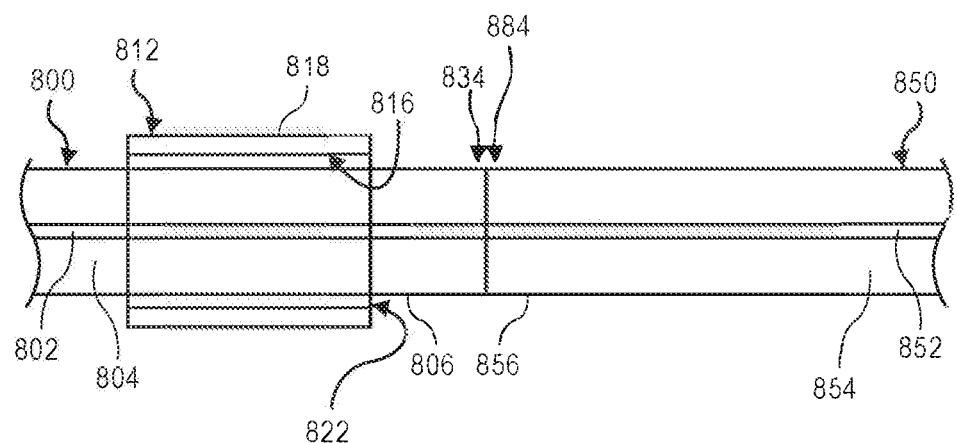
FIG. 8B illustrates an end of a first optical fiber and an end of a second optical fiber spliced together; according to some example embodiments.

FIG. 8B illustrates end 834 of first optical fiber 800 and end 884 of second optical fiber 850 spliced together using one or more techniques known to a PHOSITA, according to some example embodiments. First sleeve 812 has not yet been collapsed.

Figure 8C:
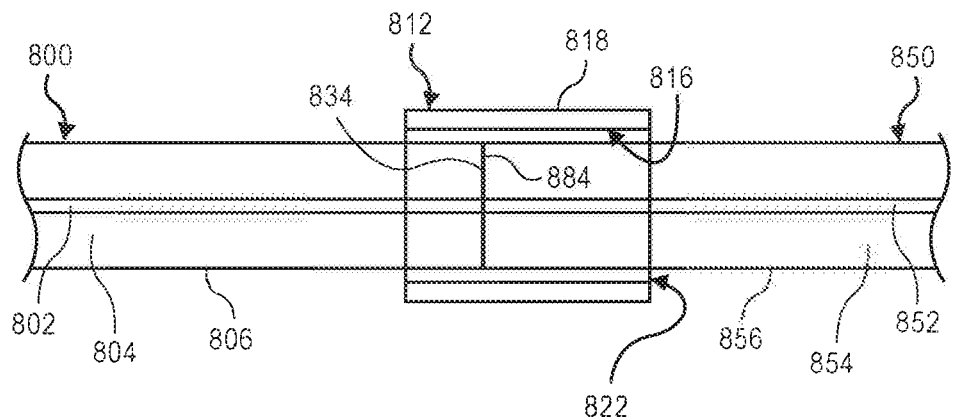
FIG. 8C illustrates a first sleeve moved over the spliced end of a first optical fiber and an end of a second optical fiber, according to some example embodiments.

FIG. 8C illustrates first sleeve 812 moved over the spliced end 834 of first optical fiber 800 and end 884 of second optical fiber 850, according to some example embodiments. Gap 822 facilitates the move of first sleeve 812 over outer surface 806 of cladding 804 and over outer surface 856 of cladding 854.

Outer surface 818 of first sleeve 812 can be roughened before, during, and/or after collapse of first sleeve 812 onto outer surface 806 of cladding 804 and outer surface 856 of cladding 854.

Figure 8D:
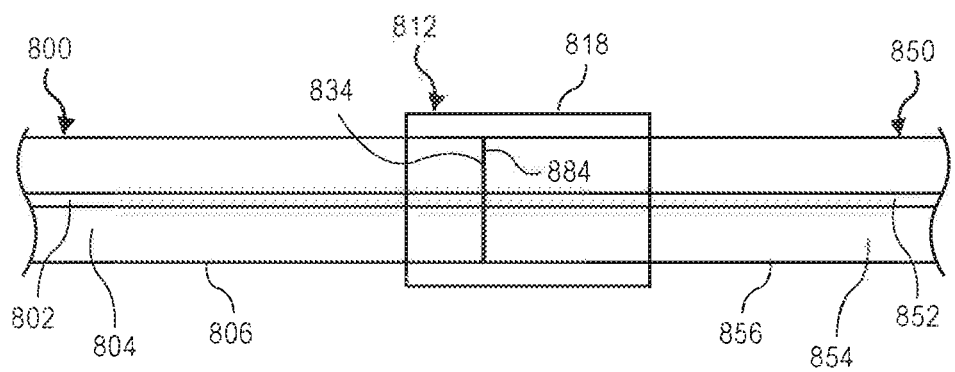
FIG. 8D illustrates a first sleeve collapsed onto an outer surface of a first cladding and an outer surface of a second cladding, over the spliced end of a first optical fiber and an end of a second optical fiber, according to some example embodiments.

FIG. 8D illustrates first sleeve 812 collapsed onto outer surface 806 of cladding 804 and outer surface 856 of cladding 854, over the spliced end 834 of first optical fiber 800 and end 884 of second optical fiber 850, according to some example embodiments.

A method of forming an apparatus for scattering light can comprise: providing a first optical fiber with a first sleeve not yet collapsed onto the first optical fiber; providing a second optical fiber; aligning an end of the first optical fiber with an end of the second optical fiber; and/or joining together the ends of first and second optical fibers. For example, a method of forming an apparatus for scattering light can comprise: providing first optical fiber 800 with first sleeve 812 not yet collapsed onto first optical fiber 800; providing second optical fiber 850; aligning end 834 of first optical fiber 800 with end 884 of second optical fiber 850; and/or joining together end 834 and end 884 using one or more techniques known to a PHOSITA.

A method of forming an apparatus for scattering light can comprise: roughening an outer surface of the first sleeve before, during, and/or after the joining together of the ends of the first and second optical fibers. For example, a method of forming an apparatus for scattering light can comprise: roughening outer surface 818 of first sleeve 812 before, during, and/or after the joining together of end 834 and end 884.

A method of forming an apparatus for scattering light can comprise: moving the first sleeve over the spliced ends of the first and second optical fibers. For example, a method of forming an apparatus for scattering light can comprise: moving first sleeve 812 over the spliced end 834 and end 884.

A method of forming an apparatus for scattering light can comprise: roughening an outer surface of the first sleeve before, during, and/or after the collapse of the first sleeve onto the outer surfaces of the first and second optical fibers. For example, a method of forming an apparatus for scattering light can comprise: roughening outer surface 818 of first sleeve 812 before, during, and/or after the collapse of first sleeve 812 onto outer surface 806 of cladding 804 and outer surface 856 of cladding 854.

A method of forming an apparatus for scattering light can comprise: collapsing the first sleeve, over the spliced ends of the first and second optical fibers, onto the outer surfaces of the first and second optical fibers. For example, a method of forming an apparatus for scattering light can comprise: collapsing first sleeve 812, over the spliced end 834 and end 884, onto outer surface 806 of cladding 804 and outer surface 856 of cladding 854.

Housings of Apparatuses for Scattering Light

Figure 9:
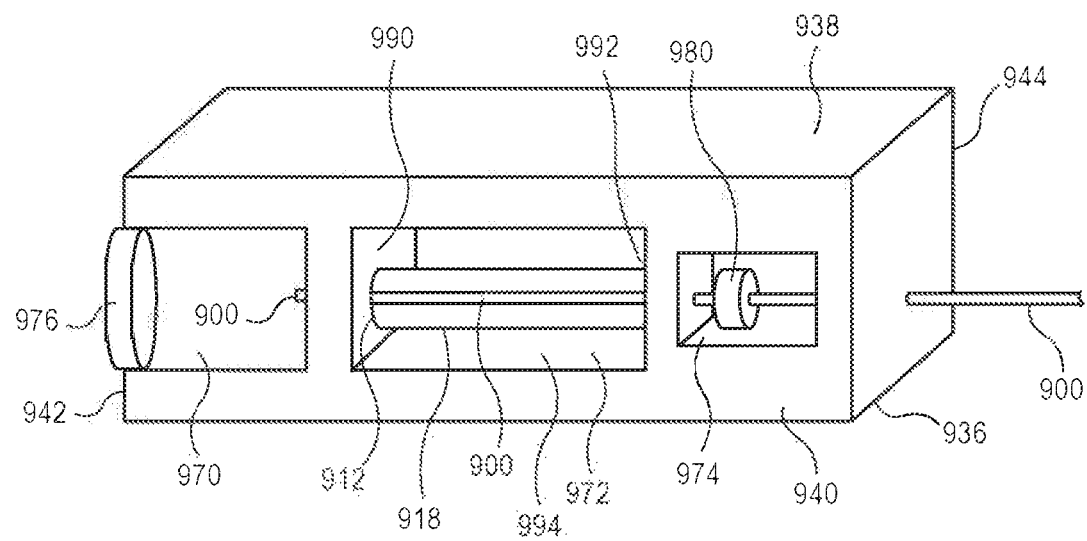
FIG. 9 illustrates a cutaway side perspective view of a first housing of an apparatus for scattering light; according to some example embodiments.

FIG. 9 illustrates a cutaway side perspective view of first housing 936 of an apparatus for scattering light, according to some example embodiments.

As illustrated in FIG. 9, first housing 936 includes upper portion 938, lower portion 940, first end 942, and second end 944. First housing 936 also can include first chamber 970, second chamber 972, and/or third chamber 974.

Additionally, as illustrated in FIG. 9, first housing 936 is configured to mount lens 976, optical fiber 900, sleeve 912 around optical fiber 900, and optional residual light catcher 980 around optical fiber 900.

Lens 976 is mounted in first chamber 970 at first end 942. Lens 976 is configured to focus incoming light on an end of optical fiber 900 in first chamber 970.

Sleeve 912 is mounted in second chamber 972, at first ferrule 990 and at second ferrule 992, so that optical fiber 900 extends from first chamber 970, through second chamber 972 and third chamber 974, and emerges from second end 944.

Residual light catcher 980 (optional), around optical fiber 900 in third chamber 974, absorbs and/or reflects light escaping from an end of sleeve 912, closest to residual light catcher 980, so as to protect downstream components (e.g., to the right in FIG. 9).

When a portion of outer surface 918 of sleeve 912 is roughened, light in sleeve 912 will be scattered out from within sleeve 912 via that portion of outer surface 918. If the roughened portion of outer surface 918 is on the lower side of sleeve 912, for example, the light in sleeve 912 will be scattered out in a generally downward direction, where the light then can be absorbed by light-absorbing material 994 at the bottom of second chamber 972. Light-absorbing material 994 is configured to absorb the light energy, and heat caused by the absorption of the light energy can be conducted away from light-absorbing material 994 via first housing 936.

The remainder of second chamber 972 can be configured to reflect light scattered out from within sleeve 912. According to some example embodiments, an inner surface of second chamber 972, other than light-absorbing material 994, can be made of or plated with a reflective non-absorber, such as aluminum or gold. Light reflected within second chamber 972 also can be absorbed by light-absorbing material 994.

The roughening can be selectively applied to outer surface 918 of sleeve 912. According to some example embodiments, outer surface 918 can be roughened only on one side (e.g., upper side or lower side).

According to some example embodiments, outer surface 918 can be modified in a periodic manner (e.g., if modified with grooves that are parallel to each other and are perpendicular to an axial direction of sleeve 912, the grooves have equal depth and spacing along the axial direction of sleeve 912) or an aperiodic manner (e.g., if modified with such parallel grooves, the grooves do not have equal depth and/or do not have equal spacing along the axial direction of sleeve 912). As known to a PHOSITA, modified in an aperiodic manner can be used to control the amount of light scattered out of sleeve 912 relative to position along the axial direction of sleeve 912. The modifying can be regular or irregular, symmetric or asymmetric.

Typically, there is no roughening or modifying of outer surface 918 at portions of sleeve 912 to be mounted at and/or near first ferrule 990 and at and/or near second ferrule 992.

Figure 10:
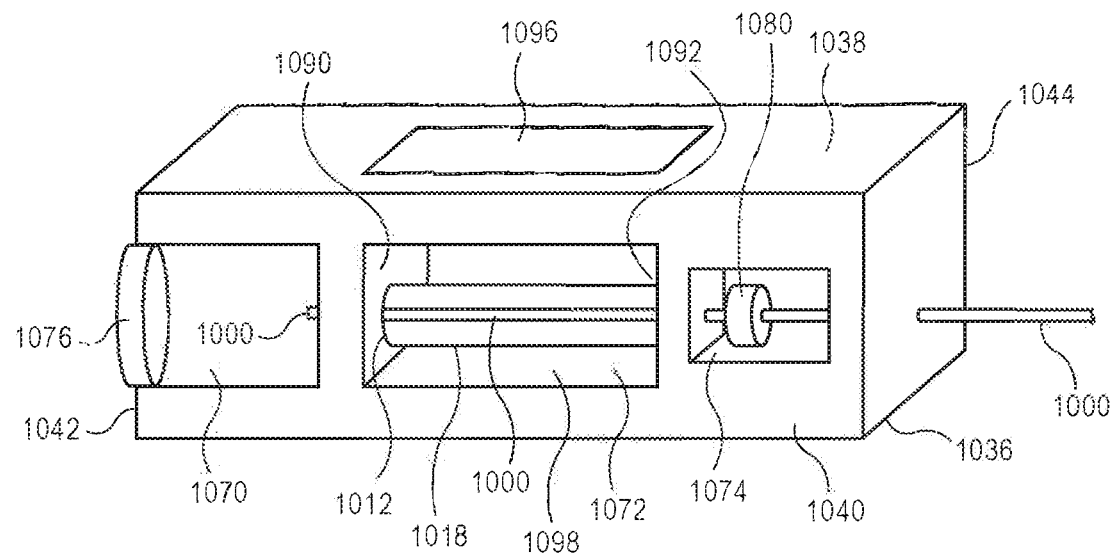
FIG. 10 illustrates a cutaway side perspective view of a second housing of an apparatus for scattering light, according to some example embodiments.

FIG. 10 illustrates a cutaway side perspective view of second housing 1036 of an apparatus for scattering light, according to some example embodiments.

As illustrated in FIG. 10, second housing 1036 includes upper portion 1038, lower portion 1040, first end 1042, and second end 1044. Second housing 1036 also can include first chamber 1070, second chamber 1072, and/or third chamber 1074.

Additionally, as illustrated in FIG. 10, second housing 1036 is configured to mount lens 1076, optical fiber 1000, sleeve 1012 around optical fiber 1000, and optional residual light catcher 1080 around optical fiber 1000.

Lens 1076 is mounted in first chamber 1070 at first end 1042. Lens 1076 is configured to focus incoming light on an end of optical fiber 1000 in first chamber 1070.

Sleeve 1012 is mounted in second chamber 1072, at first ferrule 1090 and at second ferrule 1092, so that optical fiber 1000 extends from first chamber 1070, through second chamber 1072 and third chamber 1074, and emerges from second end 1044.

Residual light catcher 1080 (optional), around optical fiber 1000 in third chamber 1074, absorbs and/or reflects light from an end of sleeve 1012, closest to residual light catcher 1080, so as to protect downstream components (e.g., to the right in FIG. 10).

When a portion of outer surface 1018 of sleeve 1012 is roughened, light in sleeve 1012 will be scattered out from within sleeve 1012 via that portion of outer surface 1018. If the roughened portion of outer surface 1018 is on the upper side of sleeve 1012, for example, the light in sleeve 1012 will be scattered out in a generally upward direction, where the light can leave second housing 1036 via first through-opening 1096. If the roughened portion of outer surface 1018 is on the lower side of sleeve 1012, for example, the light in sleeve 1012 will be scattered out in a generally downward direction, where the light can leave second housing 1036 via second through-opening 1098. If the roughened portion of outer surface 1018 is on both the upper side and the lower side of sleeve 1012, for example, the light in sleeve 1012 will be scattered out in generally upward and downward directions, where the light can leave second housing 1036 via first through-opening 1096 and via second through-opening 1098.

Having the scattered light leave second housing 1036 via first through-opening 1096 and/or via second through-opening 1098 can prevent excessive heating and/or strong thermal gradients in second housing 1036. Such excessive heating and/or strong thermal gradients in second housing 1036 can cause alignment issues between optical components (e.g., between lens 1076 and the end of optical fiber 1000 in first chamber 1070).

The remainder of second chamber 1072 can be configured to reflect light scattered out from within sleeve 1012. According to some example embodiments, an inner surface of second chamber 1072 can be made of or plated with a reflective non-absorber, such as aluminum or gold. Light reflected within second chamber 1072 also can leave second housing 1036 via first through-opening 1096 and/or via second through-opening 1098.

The roughening can be selectively applied to outer surface 1018 of sleeve 1012.

According to some example embodiments, outer surface 1018 can be roughened only on one side (e.g., upper side or lower side) or on two sides (e.g., upper side and lower side).

According to some example embodiments, outer surface 1018 can be modified in a periodic manner (e.g., if modified with grooves that are parallel to each other and are perpendicular to an axial direction of sleeve 1012, the grooves have equal depth and spacing along the axial direction of sleeve 1012) or an aperiodic manner (e.g., if modified with such parallel grooves, the grooves do not have equal depth and/or do not have equal spacing along the axial direction of sleeve 1012). As known to a PHOSITA, modifying in an aperiodic manner can be used to control the amount of light scattered out of sleeve 1012 relative to position along the axial direction of sleeve 1012. The modifying can be regular or irregular, symmetric or asymmetric.

Typically, there is no roughening or modifying of outer surface 1018 at portions of sleeve 1012 to be mounted at and/or near first ferrule 1090 and at and/or near second ferrule 1092.

Figure 11:
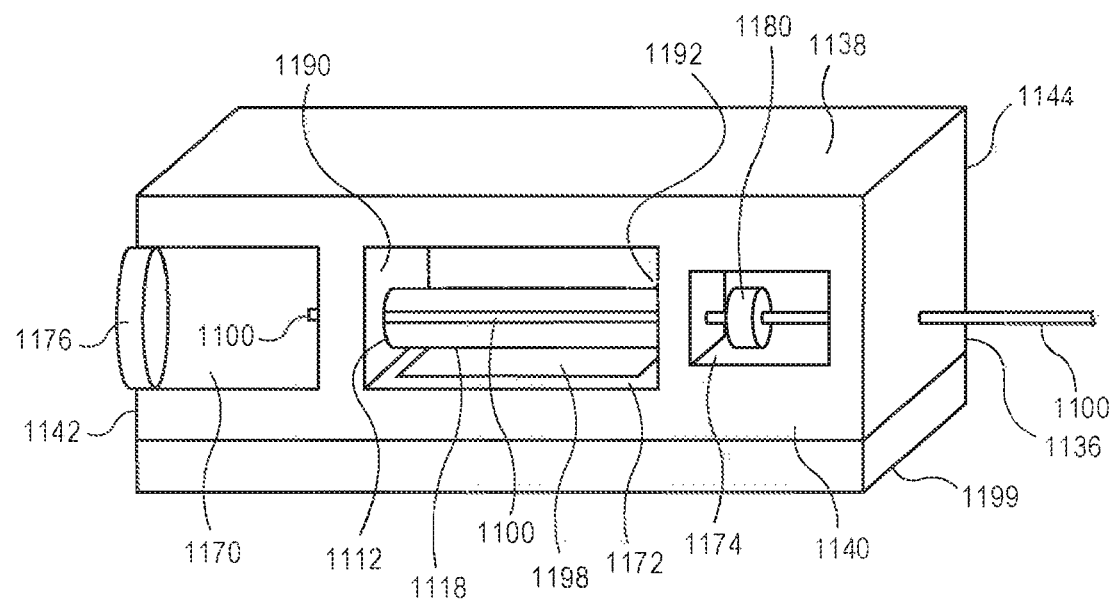
FIG. 11 illustrates a cutaway side perspective view of a third housing of an apparatus for scattering light, according to some example embodiments.

FIG. 11 illustrates a cutaway side perspective view of third housing 1136 of an apparatus for scattering light, according to some example embodiments.

As illustrated in FIG. 11, third housing 1136 includes upper portion 1138, lower portion 1140, first end 1142, and second end 1144. Third housing 1136 also can include first chamber 1170, second chamber 1172, and/or third chamber 1174.

Additionally, as illustrated in FIG. 11, third housing 1136 is configured to mount lens 1176, optical fiber 1100, sleeve 1112 around optical fiber 1100, and optional residual light catcher 1180 around optical fiber 1100.

Lens 1176 is mounted in first chamber 1170 at first end 1142. Lens 1176 is configured to focus incoming light on an end of optical fiber 1100 in first chamber 1170.

Sleeve 1112 is mounted in second chamber 1172, at first ferrule 1190 and at second ferrule 1192, so that optical fiber 1100 extends from first chamber 1170, through second chamber 1172 and third chamber 1174, and emerges from second end 1144.

Residual light catcher 1180 (optional), around optical fiber 1100 in third chamber 1174, absorbs and/or reflects light from an end of sleeve 1112, closest to residual light catcher 1180, so as to protect downstream components (e.g., to the right in FIG. 11).

When a portion of outer surface 1118 of sleeve 1112 is roughened, light in sleeve 1112 will be scattered out from within sleeve 1112 via that portion of outer surface 1118. If the roughened portion of outer surface 1118 is on a lower side of sleeve 1112, for example, the light in sleeve 1112 will be scattered out in a generally downward direction, where the scattered light can leave third housing 1136 via through-opening 1198. Such light leaving third housing 1136 via through-opening 1198 then can be absorbed in light-absorbing material 1199, which is configured to absorb the light energy and conduct the associated heat away from third housing 1136 in order to minimize or eliminate the impact of the light energy on the thermal stability of third housing 1136.

Having the scattered light leave third housing 1136 via through-opening 1198 can prevent excessive heating and/or strong thermal gradients in third housing 1136. Such excessive heating and/or strong thermal gradients in third housing 1136 can cause alignment issues between optical components (e.g., between lens 1176 and the end of optical fiber 1100 in first chamber 1170).

The remainder of second chamber 1172 can be configured to reflect light scattered out from within sleeve 1112. According to some example embodiments, an inner surface of second chamber 1172 can be made of or plated with a reflective non-absorber, such as aluminum or gold. Light reflected within second chamber 1172 also can leave third housing 1136 via through-opening 1198.

The roughening can be selectively applied to outer surface 1118 of sleeve 1112.

According to some example embodiments, outer surface 1118 can be roughened only on one side (e.g., upper side or lower side).

According to some example embodiments, outer surface 1118 can be modified in a periodic manner (e.g., if modified with grooves that are parallel to each other and are perpendicular to an axial direction of sleeve 1112, the grooves have equal depth and spacing along the axial direction of sleeve 1112) or an aperiodic manner (e.g., if roughened with such parallel grooves, the grooves do not have equal depth and/or do not have equal spacing along the axial direction of sleeve 1112). As known to a PHOSITA, modifying in an aperiodic manner can be used to control the amount of light scattered out of sleeve 1112 relative to position along the axial direction of sleeve 1112. The modifying can be regular or irregular, symmetric or asymmetric.

Typically, there is no roughening or modifying of outer surface 1118 at portions of sleeve 1112 to be mounted at and/or near first ferrule 1190 and at and/or near second ferrule 1192.

In addition to absorbing light energy, light-absorbing material 1199 can provide a mounting surface for third housing 1136. The physical dimensions of light-absorbing material 1199 can be greater than the physical dimensions of third housing 1136 (e.g., the length and/or width of light-absorbing material 1199 can be greater than the length and/or width of third housing 1136).

To facilitate absorbing light energy, light-absorbing material 1199 can have a shape other than a flat plate. According to some example embodiments, light-absorbing material 1199 can include a light-absorbing insert (see FIGS. 13A-13C and associated descriptions) that extends upward via through-opening 1198. The light-absorbing insert can at least partially wrap around, but not contact, sleeve 1112 along a length of sleeve 1112 (e.g., cradling sleeve 1112 without contacting sleeve 1112), Due to at least partially wrapping around sleeve 1112, the light-absorbing insert can provide an opportunity to roughen a larger portion of outer surface 1118 of sleeve 1112, so as to facilitate the scattering of light out from within sleeve 1112.

Figure 12:
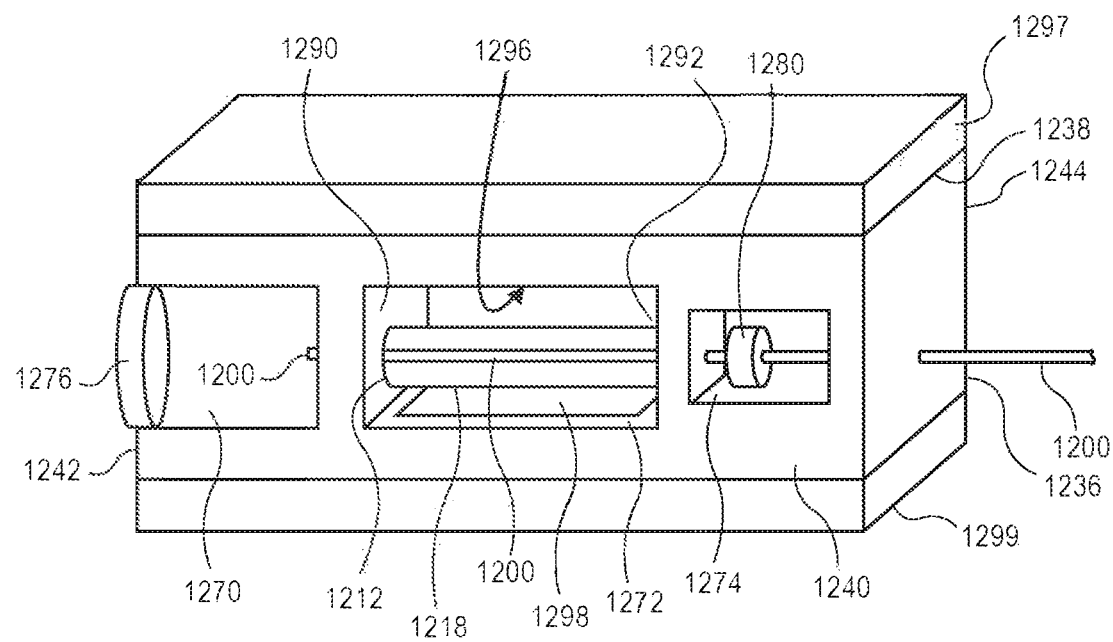
FIG. 12 illustrates a cutaway side perspective view of a fourth housing of an apparatus for scattering light, according to some example embodiments.

FIG. 12 illustrates a cutaway side perspective view of fourth housing 1236 of an apparatus for scattering light, according to some example embodiments.

As illustrated in FIG. 12, fourth housing 1236 includes upper portion 1238, lower portion 1240, first end 1242, and second end 1244. Fourth housing 1236 also can include first chamber 1270, second chamber 1272, and/or third chamber 1274.

Additionally, as illustrated in FIG. 12, fourth housing 1236 is configured to mount lens 1276, optical fiber 1200, sleeve 1212 around optical fiber 1200, and optional residual light catcher 1280 around optical fiber 1200.

Lens 1276 is mounted in first chamber 1270 at first end 1242. Lens 1276 is configured to focus incoming light on an end of optical fiber 1200 in first chamber 1270.

Sleeve 1212 is mounted in second chamber 1272, at first ferrule 1290 and at second ferrule 1292, so that optical fiber 1200 extends from first chamber 1270, through second chamber 1272 and third chamber 1274, and emerges from second end 1244.

Residual light catcher 1280 (optional), around optical fiber 1200 in third chamber 1274, absorbs and/or reflects light from an end of sleeve 1212, closest to residual light catcher 1280, so as to protect downstream components (e.g., to the right in FIG. 12).

When a portion of outer surface 1218 of sleeve 1212 is roughened, light in sleeve 1212 will be scattered out from within sleeve 1212 via that portion of outer surface 1218. If the roughened portion of outer surface 1218 is on an upper side of sleeve 1212, for example, the light in sleeve 1212 will be scattered out in a generally upward direction, where the scattered light can leave fourth housing 1236 via first through-opening 1296. Such light leaving fourth housing 1236 via first through-opening 1296 then can be absorbed in first light-absorbing material 1297, which is configured to absorb the light energy and conduct the associated heat away from fourth housing 1236 in order to minimize or eliminate the impact of the light energy on the thermal stability of fourth housing 1236.

If the roughened portion of outer surface 1218 is on a lower side of sleeve 1212, for example, the light in sleeve 1212 will be scattered out in a generally downward direction, where the scattered light can leave fourth housing 1236 via second through-opening 1298. Such light leaving fourth housing 1236 via second through-opening 1298 then can be absorbed in second light-absorbing material 1299, which is configured to absorb the light energy and conduct the associated heat away from fourth housing 1236 in order to minimize or eliminate the impact of the light energy on the thermal stability of fourth housing 1236.

Having the scattered light leave fourth housing 1236 via first through-opening 1296 and/or via second through-opening 1298 can prevent excessive heating and/or strong thermal gradients in fourth housing 1236. Such excessive heating and/or strong thermal gradients in fourth housing 1236 can cause alignment issues between optical components (e.g., between lens 1276 and the end of optical fiber 1200 in first chamber 1270).

The remainder of second chamber 1272 can be configured to reflect light scattered out from within sleeve 1212. According to some example embodiments, an inner surface of second chamber 1272 can be made of or plated with a reflective non-absorber, such as aluminum or gold. Light reflected within second chamber 1272 also can leave fourth housing 1236 via first through-opening 1296 and/or via second through-opening 1298.

The roughening can be selectively applied to outer surface 1218 of sleeve 1212.

According to some example embodiments, outer surface 1218 can be roughened only on one side (e.g., upper side or lower side) or on two sides (e.g., upper side and lower side).

According to some example embodiments, outer surface 1218 can be modified in a periodic manner (e.g., if modified with grooves that are parallel to each other and are perpendicular to an axial direction of sleeve 1212, the grooves have equal depth and spacing along the axial direction of sleeve 1212) or an aperiodic manner (e.g., if roughened with such parallel grooves, the grooves do not have equal depth and/or do not have equal spacing along the axial direction of sleeve 1212). As known to a PHOSITA, modifying in an aperiodic manner can be used to control the amount of light scattered out of sleeve 1212 relative to position along the axial direction of sleeve 1212. The modifying can be regular or irregular, symmetric or asymmetric.

Typically, there is no roughening or modifying of outer surface 1218 at portions of sleeve 1212 to be mounted at and/or near first ferrule 1290 and at and/or near second ferrule 1292.

In addition to absorbing light energy, first light-absorbing material 1297 and/or second light-absorbing material 1299 can provide a mounting surface for fourth housing 1236. The physical dimensions of first light-absorbing material 1297 and/or second light-absorbing material 1299 can be greater than the physical dimensions of fourth housing 1236 (e.g., the length and/or width of first light-absorbing material 1297 and/or second light-absorbing material 1299 can be greater than the length and/or width of fourth housing 1236).

According to some example embodiments, first light-absorbing material 1297 and second light-absorbing material 1299 can be shaped as flat plates. In such an arrangement, fourth housing 1236 can be sandwiched between first light-absorbing material 1297 and second light-absorbing material 1299, similar to that shown in FIG. 12.

According to some example embodiments, second light-absorbing material 1299 can be shaped as a flat plate, while first light-absorbing material 1297 can be shaped similar to a squared-off version of the Greek letter omega ("Ω"). In such an arrangement, fourth housing 1236 can be mounted on second light-absorbing material 1299, and then first light-absorbing material 1297 can be placed on top of fourth housing 1236, with the sides of first light-absorbing material 1297 covering the sides of fourth housing 1236 all the way down to second light-absorbing material 1299, and with the tail ends of first light-absorbing material 1297 contacting and/or mating with second light-absorbing material 1299.

Figure 13A:
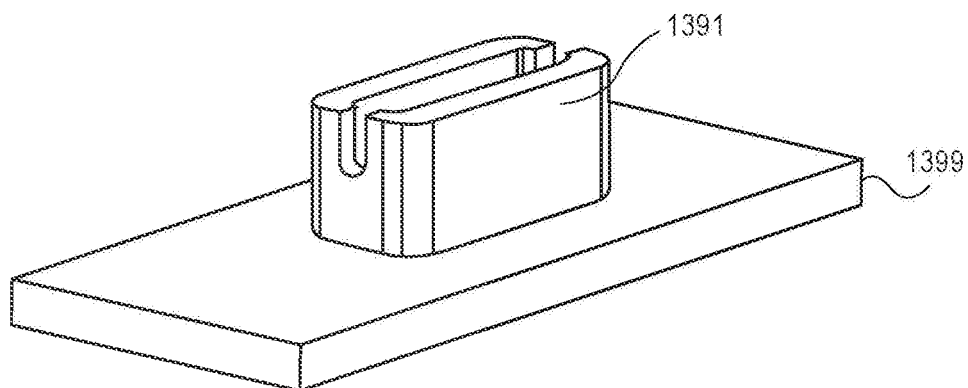
FIGS. 13A-13C illustrate perspective views of a fifth housing of an apparatus for scattering light; according to some example embodiments.
Figure 13B:
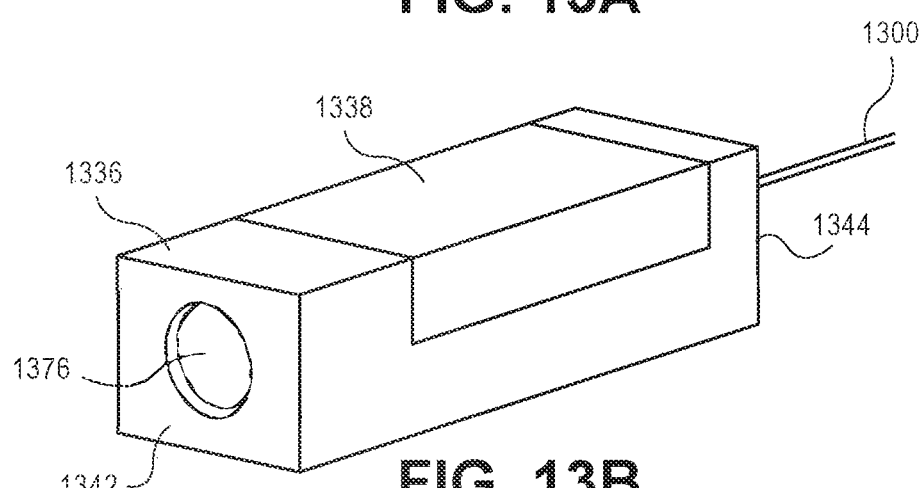
Figure 13C:
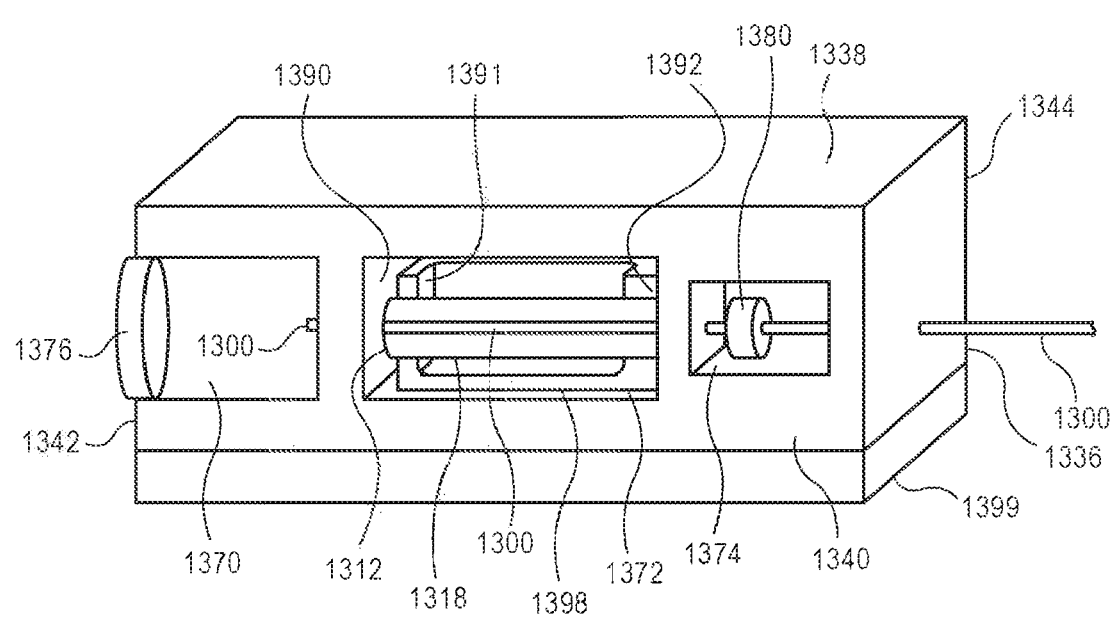

FIGS. 13A-13C illustrate perspective views of fifth housing 1336 of an apparatus for scattering light, according to some example embodiments.

As illustrated in FIG. 13A, light-absorbing material 1399 can include light-absorbing insert 1391 that extends upward from light-absorbing material 1399. Light-absorbing insert 1391 can be shaped so as to accept optical fiber 1300 and sleeve 1312 around optical fiber 1300.

Light-absorbing insert 1391 can at least partially wrap around, but not contact, sleeve 1312 along a length of sleeve 1312 (e.g., cradling sleeve 1312 without contacting sleeve 1312). Due to at least partially wrapping around sleeve 1312, light-absorbing insert 1391 can provide an opportunity to roughen a larger portion of outer surface 1318 of sleeve 1312, so as to facilitate the scattering of light out from within sleeve 1312.

When a portion of outer surface 1318 of sleeve 1312 is roughened, light in sleeve 1312 will be scattered out from within sleeve 1312 via that portion of outer surface 1318. The light scattered out from within sleeve 1312 can then be absorbed by light-absorbing insert 1391 and/or light-absorbing material 1399.

As illustrated in FIG. 13B, fifth housing 1336 includes upper portion 1338 (that can be detachable for accessibility of optical fiber 1300 and sleeve 1312 around optical fiber 1300), first end 1342, and second end 1344. Additionally, as illustrated in FIG. 13B, fifth housing 1336 is configured to mount lens 1376.

As illustrated in FIG. 13C, fifth housing 1336 includes upper portion 1338, lower portion 1340, first end 1342, and second end 1344. Fifth housing 1336 also can include first chamber 1370, second chamber 1372, and/or third chamber 1374.

Additionally, as illustrated in FIG. 13C, fifth housing 1336 is configured to mount lens 1376, optical fiber 1300, sleeve 1312 around optical fiber 1300, and optional residual light catcher 1380 around optical fiber 1300.

Lens 1376 is mounted in first chamber 1370 at first end 1342. Lens 1376 is configured to focus incoming light on an end of optical fiber 1300 in first chamber 1370.

Sleeve 1312 is mounted in second chamber 1372, at first ferrule 1390 and at second ferrule 1392, so that optical fiber 1300 extends from first chamber 1370, through second chamber 1372 and third chamber 1374, and emerges from second end 1344.

Residual light catcher 1380 (optional), around optical fiber 1300 in third chamber 1374, absorbs and/or reflects light from an end of sleeve 1312, closest to residual light catcher 1380, so as to protect downstream components (e.g., to the right in FIG. 13C).

When a portion of outer surface 1318 of sleeve 1312 is roughened, light in sleeve 1312 will be scattered out from within sleeve 1312 via that portion of outer surface 1318. If the roughened portion of outer surface 1318 is on a side of sleeve 1312, for example, the light in sleeve 1312 will be scattered out in a generally sideward direction, where the scattered light can be absorbed by light-absorbing insert 1391 and/or light-absorbing material 1399, which are configured to absorb the light energy and conduct the associated heat away from fifth housing 1336 in order to minimize or eliminate the impact of the light energy on the thermal stability of fifth housing 1336.

Having the scattered light leave fifth housing 1336 via by light-absorbing insert 1391 and/or light-absorbing material 1399 can prevent excessive heating and/or strong thermal gradients in fifth housing 1336. Such excessive heating and/or strong thermal gradients in fifth housing 1336 can cause alignment issues between optical components (e.g., between lens 1376 and the end of optical fiber 1300 in first chamber 1370).

The remainder of second chamber 1372 can be configured to reflect light scattered out from within sleeve 1312. According to some example embodiments, an inner surface of second chamber 1372 can be made of or plated with a reflective non-absorber, such as aluminum or gold. Light reflected within second chamber 1372 also then can be absorbed by light-absorbing insert 1391 and/or light-absorbing material 1399.

The roughening can be selectively applied to outer surface 1318 of sleeve 1312.

According to some example embodiments, outer surface 1318 can be roughened only on one side (e.g., upper side or lower side).

According to some example embodiments, outer surface 1318 can be modified in a periodic manner (e.g., if modified with grooves that are parallel to each other and are perpendicular to an axial direction of sleeve 1312, the grooves have equal depth and spacing along the axial direction of sleeve 1312) or an aperiodic manner (e.g., if roughened with such parallel grooves, the grooves do not have equal depth and/or do not have equal spacing along the axial direction of sleeve 1312). As known to a PHOSITA, modifying in an aperiodic manner can be used to control the amount of light scattered out of sleeve 1312 relative to position along the axial direction of sleeve 1312. The modifying can be regular or irregular, symmetric or asymmetric.

Typically, there is no roughening or modifying of outer surface 1318 at portions of sleeve 1312 to be mounted at and/or near first ferrule 1390 and at and/or near second ferrule 1392.

In addition to absorbing light energy, light-absorbing material 1399 can provide a mounting surface for fifth housing 1336. The physical dimensions of light-absorbing material 1399 can be greater than the physical dimensions of fifth housing 1336 (e.g., the length and/or width of light-absorbing material 1399 can be greater than the length and/or width of fifth housing 1336).

Having described and illustrated the general and specific principles of examples of the presently disclosed technology, it should be apparent that the examples may be modified in arrangement and detail without departing from such principles. We claim all modifications and variation corning within the spirit and scope of the following claims.

We claim:

1. An apparatus for scattering light, the apparatus comprising:
    an optical fiber having a length and an outer surface; and
    a sleeve having a first end and a second end, wherein the sleeve has a length shorter than the length of the optical fiber, coupled around the optical fiber;
    wherein the optical fiber comprises:
        a core; and
        a cladding around the core, the cladding having a refractive index;
    wherein the sleeve comprises a fiber-optic material having an equal or higher volumetric coefficient of thermal expansion relative to the optical fiber and having a refractive index greater than the refractive index of the cladding,
    wherein the fiber-optic material is substantially polymer-free,
    wherein the sleeve comprises inner and outer surfaces, at least a portion of the outer surface of the sleeve is roughened to scatter the light out of the sleeve through the roughened outer surface, and
    wherein the inner surface of the sleeve and the outer surface of the optical fiber exclude a gap and bubbles of air or gas therebetween, along an entirety of the length of the sleeve between the first end and the second end.

2. The apparatus of claim 1, wherein the inner surface of the sleeve directly contacts the optical fiber over an entirety of the second length.

3. The apparatus of claim 1, wherein the inner surface of the sleeve directly contacts the optical fiber over a portion of the second length.

4. The apparatus of claim 1, further comprising:
    a filler between the optical fiber and the sleeve over a portion of the length of the sleeve or over an entirety of the length of the sleeve, the filler having a refractive index greater than the refractive index of the cladding and less than the refractive index of the sleeve.

5. The apparatus of claim 1, further comprising:
    a housing comprising at least a first chamber and a second chamber; and
    a lens disposed in the first chamber,
    wherein the optical fiber extends from the first chamber,
    wherein the optical fiber extends through the second chamber, and
    wherein the sleeve is disposed in the second chamber, around the optical fiber.

6. The apparatus of claim 5, further comprising:
    a third chamber, wherein the optical fiber extends through the third chamber; and
    a residual light catcher disposed around the optical fiber, wherein the residual light catcher absorbs and/or reflects light escaping from an end of the sleeve closest to the residual light catcher.

7. The apparatus of claim 5, further comprising:
    a light absorbing material disposed in a portion of the second chamber,
    wherein light exiting the roughened portion of the outer surface of the sleeve is absorbed by the light absorbing material.

8. The apparatus of claim 7, further comprising:
    a reflective non-absorber disposed in at least a portion of the second chamber not containing the light absorbing material.

9. A method of forming an apparatus for scattering light, the method comprising:
    providing a sleeve having a length, the sleeve having inner and outer surfaces and first and second ends;
    providing an optical fiber having a length longer than the length of the sleeve, the optical fiber comprising a core, an outer surface, and a cladding around the core, the cladding having a refractive index;

passing the sleeve around the optical fiber; and roughening at least a portion of the outer surface of the sleeve;

wherein the sleeve comprises a fiber-optic material having an equal or higher volumetric coefficient of thermal expansion relative to the optical fiber and having a refractive index greater than the refractive index of the cladding, wherein the fiber-optic material is substantially polymer-free, and wherein the inner surface of the sleeve and the outer surface of the optical fiber exclude a gap and bubbles of air or gas therebetween, along an entirety of the length of the sleeve between the first end and the second end.

10. The method of claim 9, wherein the roughening of the outer surface of the sleeve occurs prior to the passing of the sleeve around the optical fiber.

11. The method of claim 9, wherein the roughening of the outer surface of the sleeve occurs during the passing of the sleeve around the optical fiber.

12. The method of claim 9, wherein the roughening of the outer surface of the sleeve occurs after the passing of the sleeve around the optical fiber.

13. The method of claim 9, further comprising:
collapsing the sleeve onto the optical fiber.

14. The method of claim 13, wherein the roughening of the outer surface of the sleeve occurs prior to the collapsing of the sleeve onto the optical fiber.

15. The method of claim 13, wherein the roughening of the outer surface of the sleeve occurs during the collapsing of the sleeve onto the optical fiber.

16. The method of claim 13, wherein the roughening of the outer surface of the sleeve occurs after the collapsing of the sleeve onto the optical fiber.

\* \* \* \* \*